United States Patent
Hamada et al.

(10) Patent No.: US 6,871,534 B1
(45) Date of Patent: Mar. 29, 2005

(54) FLOW RATE MEASURING DEVICE

(75) Inventors: Shingo Hamada, Tokyo (JP);
 Fumiyoshi Yonezawa, Tokyo (JP);
 Hiroyuki Uramachi, Tokyo (JP);
 Tomoya Yamakawa, Tokyo (JP);
 Takeharu Oshima, Tokyo (JP); Satoru Kotoh, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/425,630

(22) Filed: Oct. 22, 1999

(30) Foreign Application Priority Data

Dec. 21, 1998 (JP) .......................................... 10-362724
May 12, 1999 (JP) .......................................... 11-131570

(51) Int. Cl.$^7$ .............................................. G01F 1/68
(52) U.S. Cl. ................................... 73/204.22; 73/202.5
(58) Field of Search ................... 73/204.21, 204.26, 73/204.22, 204.25, 118.2, 202, 202.5

(56) References Cited

U.S. PATENT DOCUMENTS

| | | | | |
|---|---|---|---|---|
| 2,509,889 A | * | 5/1950 | Shockley ................. | 73/204.21 |
| 4,433,576 A | | 2/1984 | Shih et al. .................... | 73/204 |
| 4,991,560 A | | 2/1991 | Arai et al. | |
| 5,249,462 A | * | 10/1993 | Bonne ...................... | 73/204.21 |
| 5,381,691 A | | 1/1995 | Miyazaki et al. .......... | 73/202.5 |
| 5,383,357 A | | 1/1995 | Doll ........................... | 73/118.2 |
| 5,386,725 A | | 2/1995 | Yamakawa et al. | |
| 5,476,012 A | | 12/1995 | Takashima | |
| 6,018,994 A | | 2/2000 | Yonezawa et al. | |
| 6,079,264 A | | 6/2000 | Yamakawa et al. | |
| 6,240,775 B1 | * | 6/2001 | Uramachi et al. ....... | 73/204.21 |

FOREIGN PATENT DOCUMENTS

| | | |
|---|---|---|
| DE | 41 30 218 | 3/1993 |
| DE | 43 40 882 | 6/1995 |
| DE | 196 40 395 | 4/1997 |
| JP | 2-232524 | 9/1990 |
| JP | 4040323 | 2/1992 |
| JP | 5018795 | 1/1993 |
| JP | 6307906 | 11/1994 |
| JP | 10-142020 | 5/1998 |
| JP | 10293052 | 11/1998 |
| JP | 10300545 | 11/1998 |

* cited by examiner

*Primary Examiner*—Harshad Patel
(74) *Attorney, Agent, or Firm*—Leydig, Voit & Mayer, Ltd.

(57) ABSTRACT

A post in a fluid passage for passing a fluid flow extends across a part of the fluid flow; a measuring duct in the post extends through the post; and a flow rate detector is located in the measuring duct. The measuring duct has a fluid introduction port with an elongated shape, the measuring duct is constricted and has at least a portion located between the fluid introduction port and the flow rate detector, substantially smoothly narrowing toward a downstream direction of the flow in a longitudinal direction of the elongated shape.

15 Claims, 32 Drawing Sheets

F I G. 2
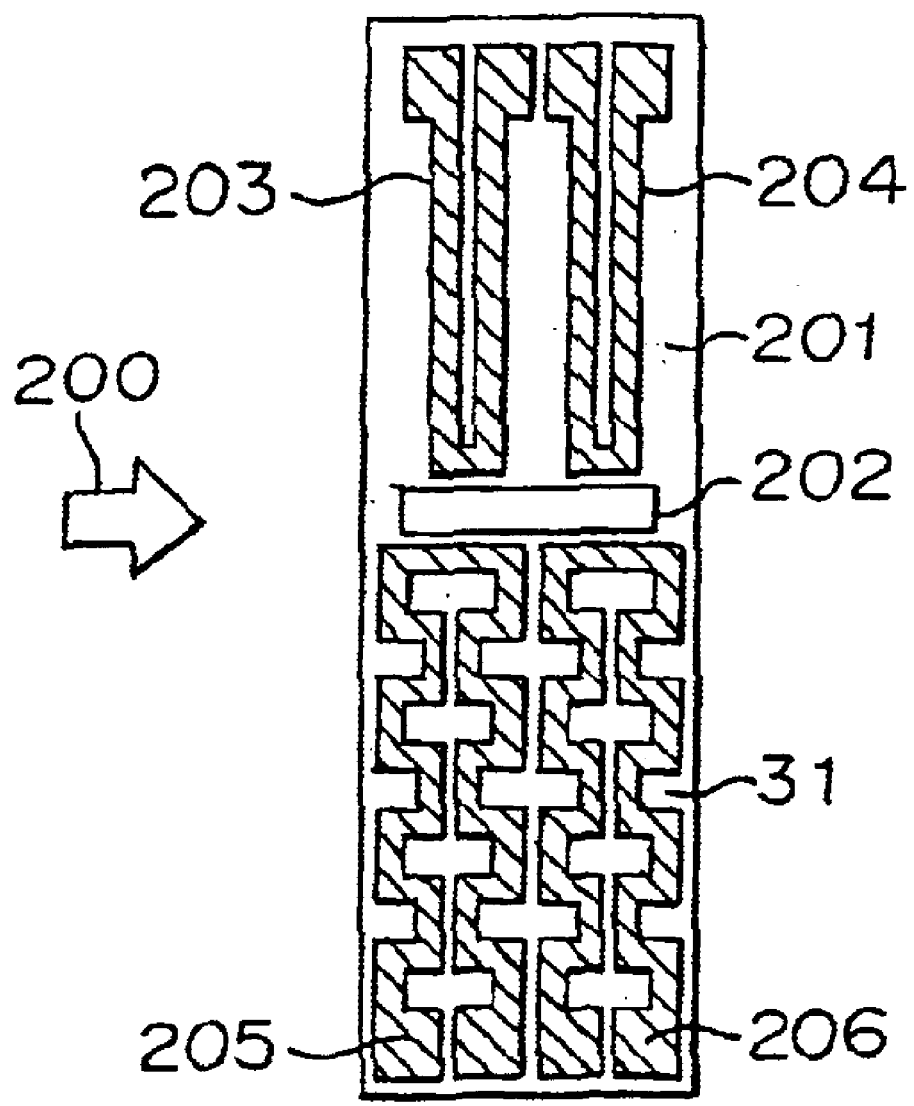

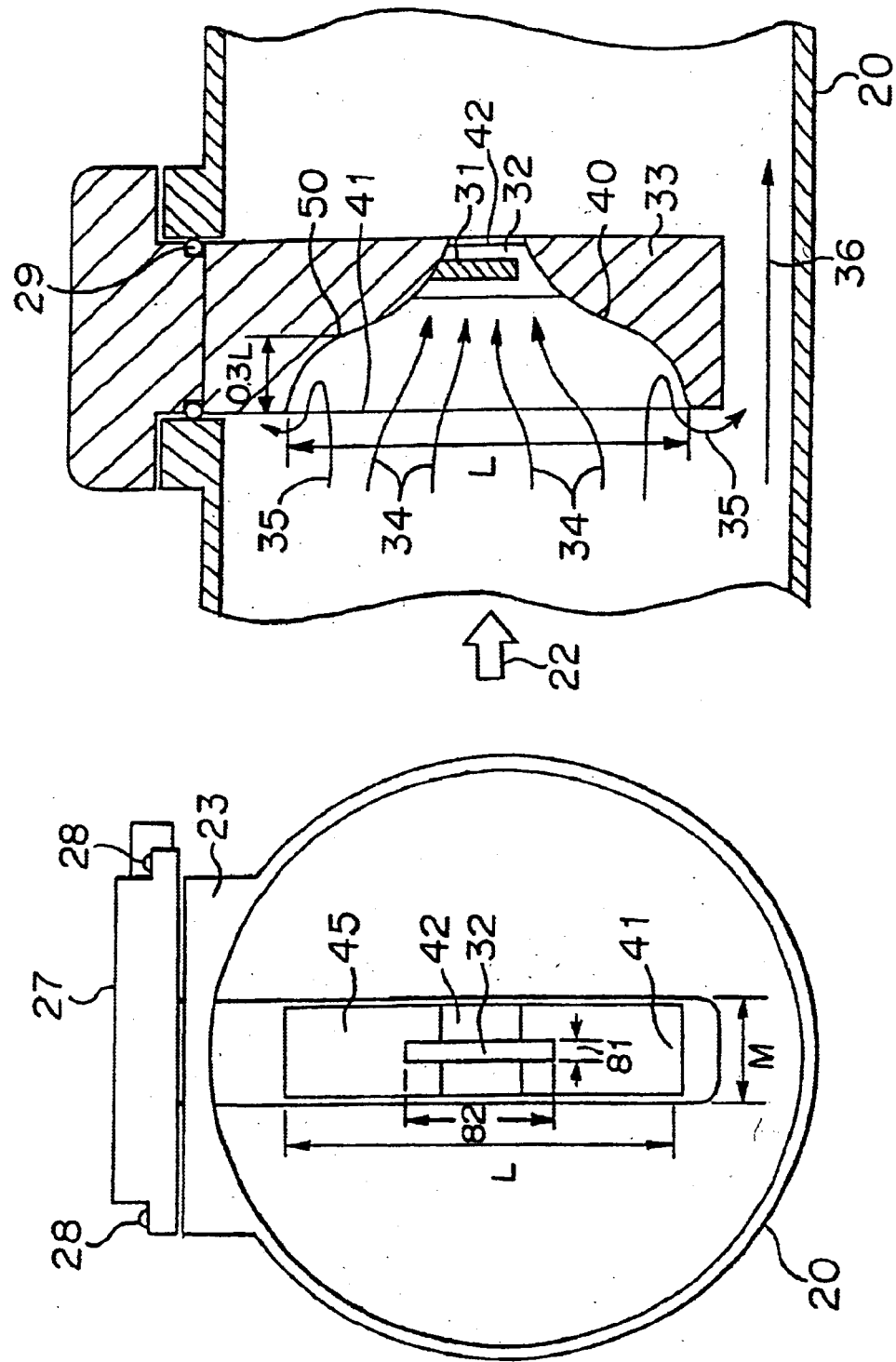

F I G. 7(a)
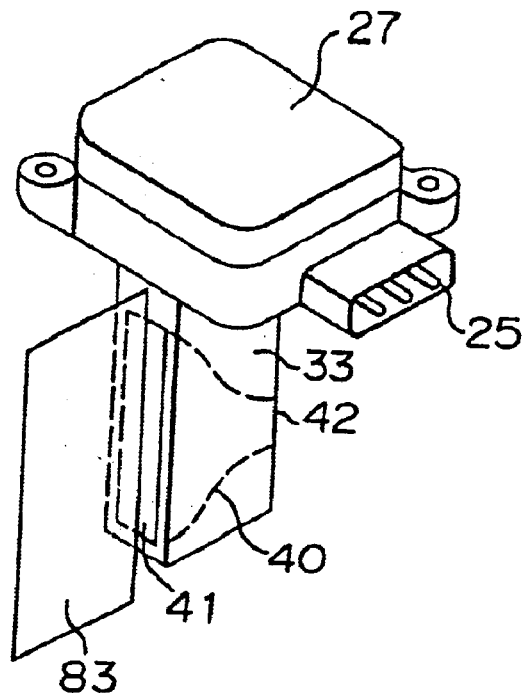
F I G. 7(b)
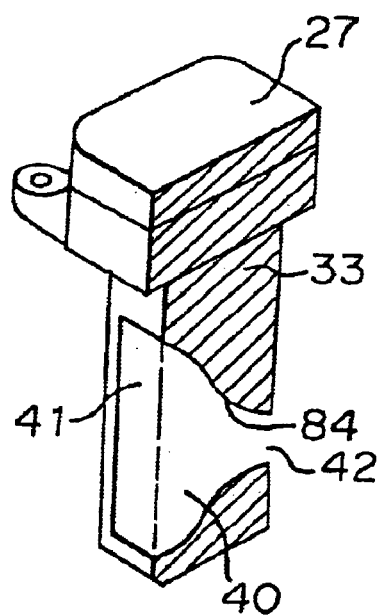

F I G. 8(a)
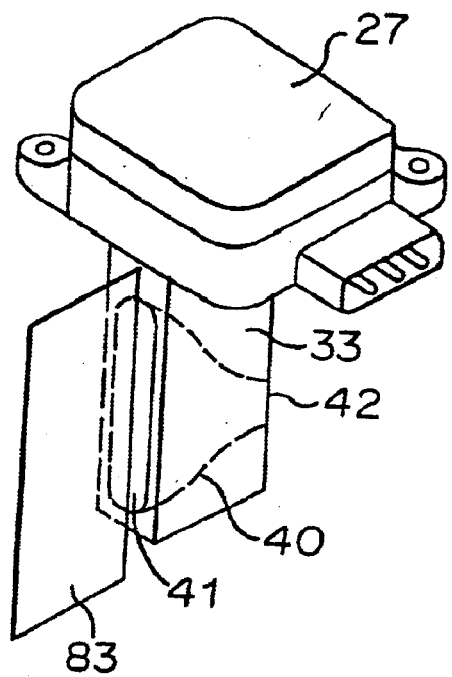
F I G. 8(b)
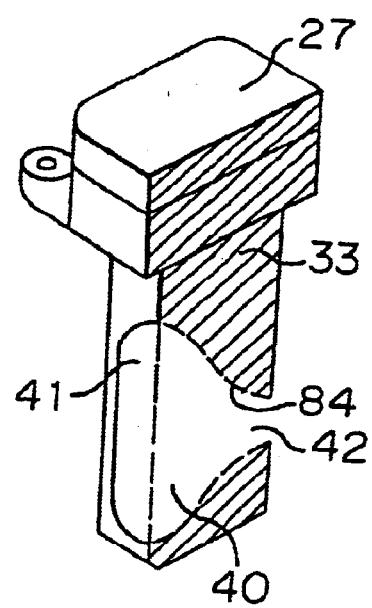

F I G. 9(a)
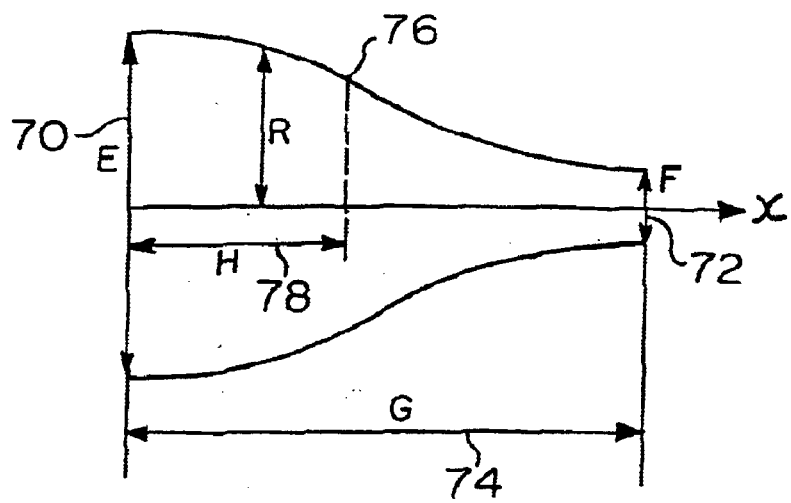
F I G. 9(b)
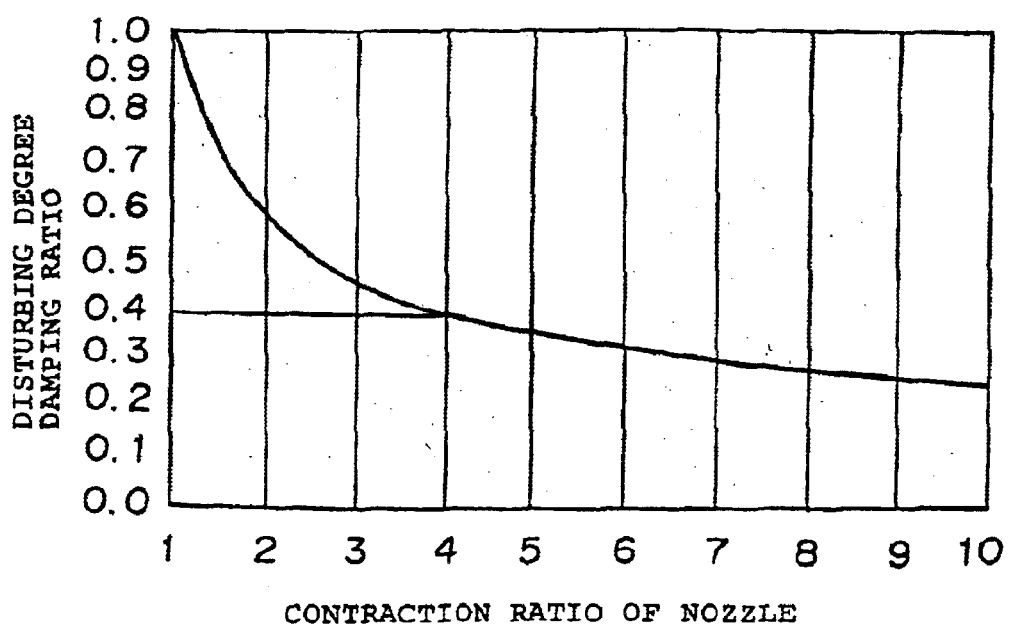

F I G. 12(a)
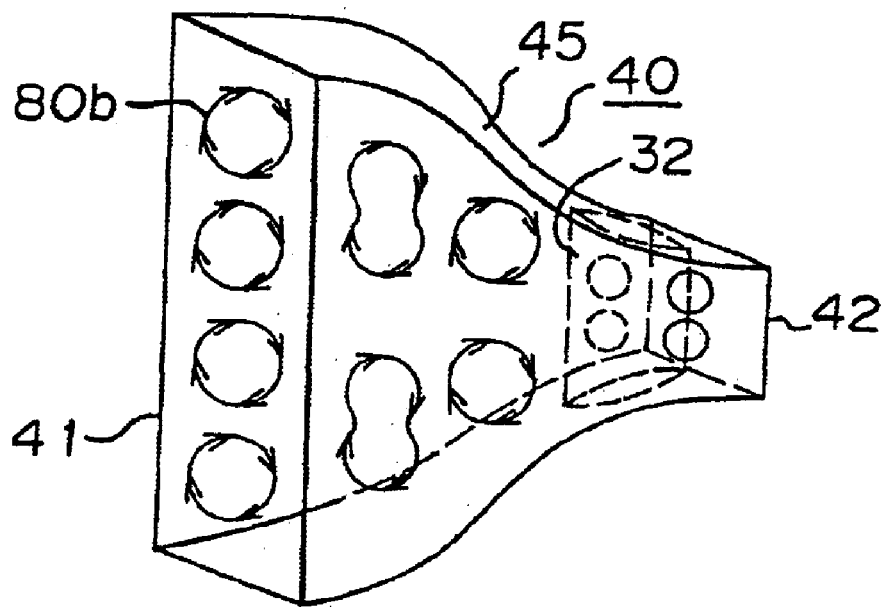
F I G. 12(b)
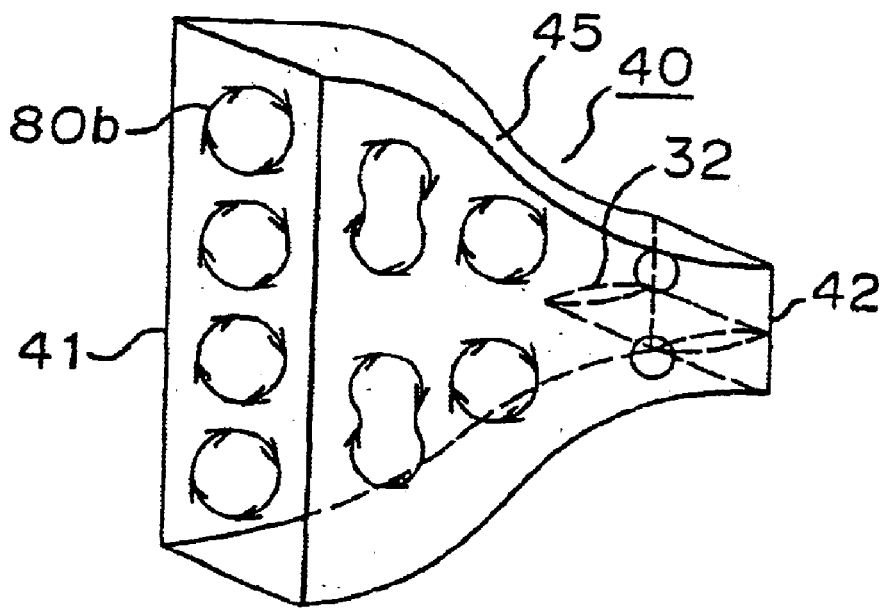

F I G. 27
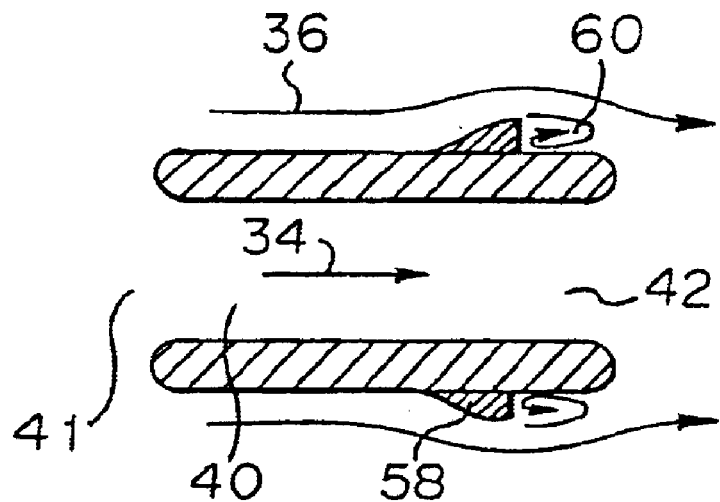
F I G. 28
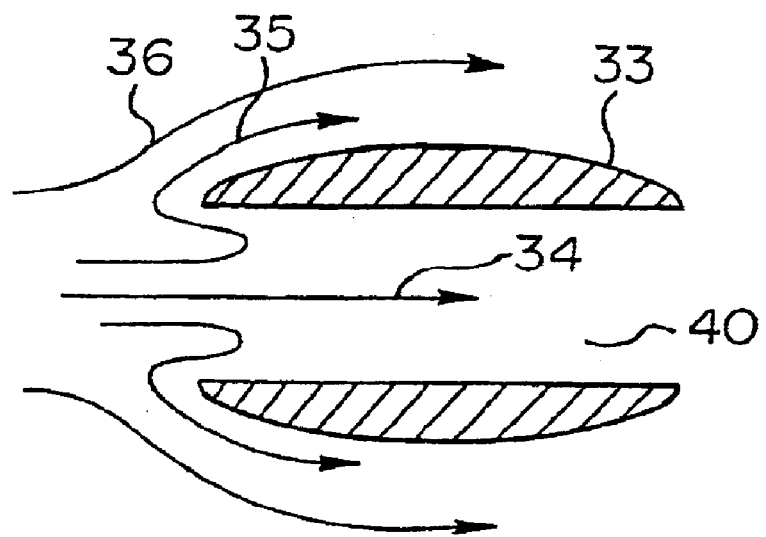

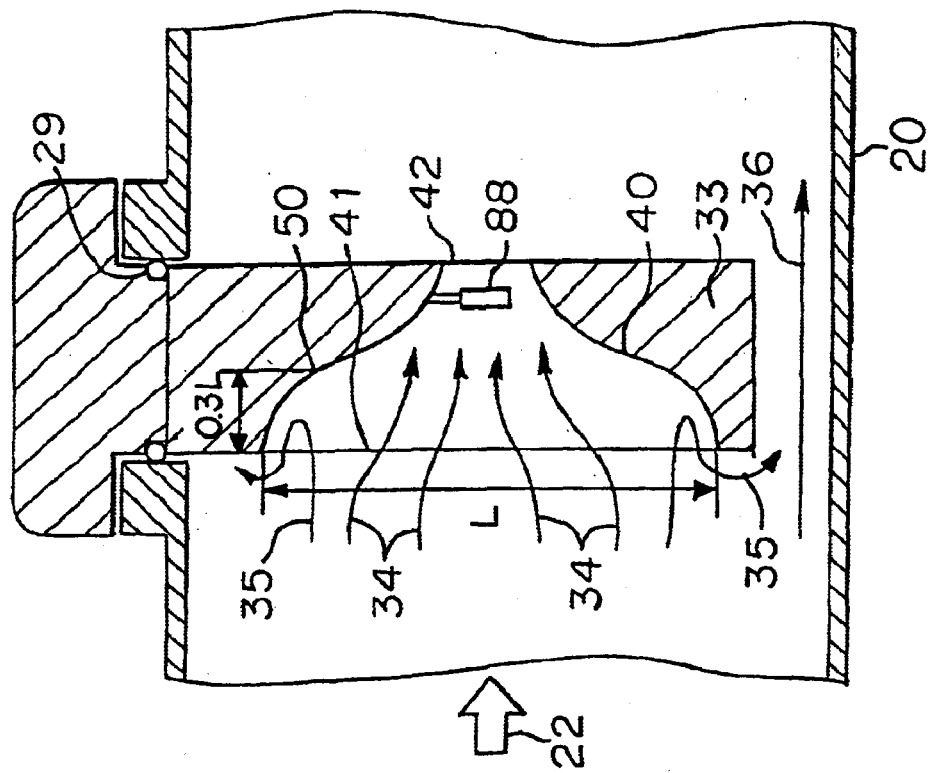
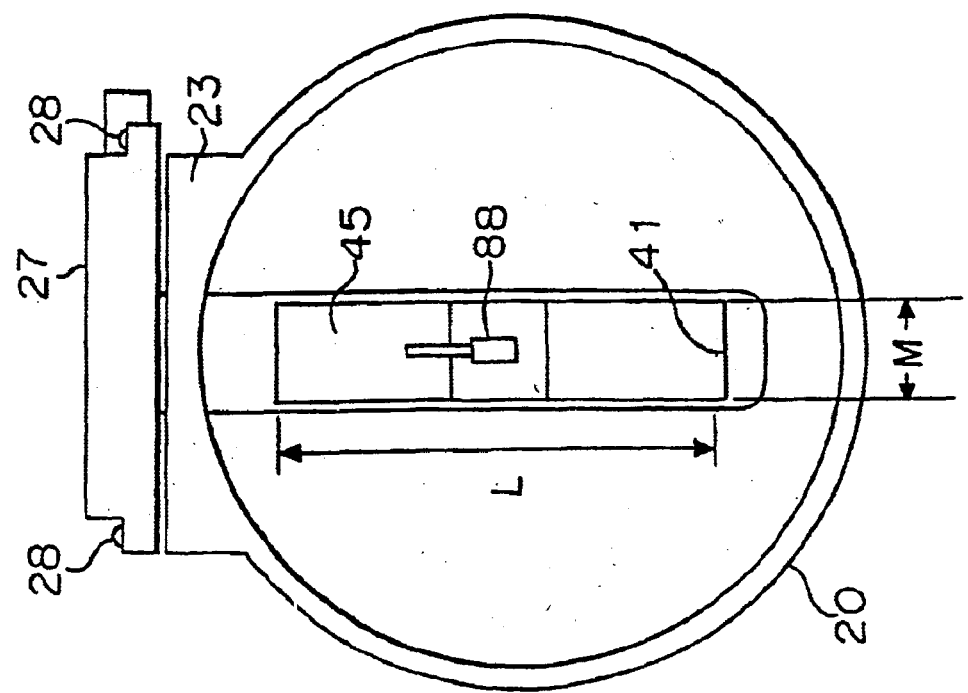

FLOW RATE MEASURING DEVICE

BACKGROUND OF THE INVENTION

1. FIELD OF THE INVENTION

The present invention relates to a flow rate measuring device, in particular a device for measuring the mass flow rate of intake air into an internal combustion engine.

2. DISCUSSION OF BACKGROUND

Before explaining prior art, a typical problem in the induction system for automobile engines will be explained. In FIG. 36 is shown a schematic cross-sectional view of the structure of an induction system for a typical automobile engine. In this FIG., reference numeral 1 designates an intake air flow rate measuring device for measuring the flow rate of intake air, and the reference numeral 31 designates a sensor in the device, or a flow rate detecting element. Reference numeral 2 designates an air cleaner, reference numeral 3 designates an air filter, reference numeral 4 designates arrows to indicate the flow direction of the intake air from the atmosphere, reference numeral 5 designates dirt and dust mingling in the air as contaminants, reference numeral 6 designates a bellmouth for increasing trapping efficiency, reference numeral 7 designates a throttle valve for controlling an intake air quantity in cooperation with an accel pedal (not shown), reference numeral 8 designates a surge tank, reference numeral 11 designates an engine combustion chamber, reference numeral 20 designates an induction pipe for introduction of the intake air, reference numeral 9a designates an intake manifold for introducing the intake air into the engine combustion chamber 11, reference numeral 9b designates an exhaust manifold for exhausting exhaust gas after combustion, reference numeral 10a designates an intake valve, reference numeral 10b designates an exhaust valve, and reference numeral 12 designates wiring to be used for the flow rate measuring device 1.

In the induction system, the intake air is filtered by the entire surface of the air filter 3 as shown as air streams in the air cleaner 2 indicated by arrows 13a, 13b, 13c, 14a, 14b and 14c. Since the intake air flow rate measuring device 1 is normally provided in the vicinity of the outlet of the air cleaner, the flow rate measuring device 1 can be clearly affected by a change in the air streams in the air cleaner 2 due to clogging of the air filter 3.

In FIG. 37 is shown a schematic view to explain how air streams are created when the dirt and dust 5 has deposited on the air filter 3. When the dirt and dust 5 is taken into the induction system as shown in FIG. 36, the dirt and dust 5 has deposited in the vicinity of the inlet of the air cleaner 2 in a large amount to clog the air cleaner, significantly changing the air passage. The air streams in the air cleaner 2 in such a case are indicated by arrows 15a, 15b, 15c, 16a, 16b and 16c. The clogged portion of the air filter 3 on the inlet side can not permit the air to pass, and the intake air passes through unclogged portions of the air filter 3.

When the dirt and dust 5 has deposited on the air filter 3 as stated above, vortexes are generated as shown by the arrows 15a and 16a, and the portions of the air filter 3 through which the intake air passes changes significantly. In such a case, irregular vortexes mingle with the air flow into the flow rate measuring device 1 to increase a disturbing degree, changing the flow velocity distribution or the non-uniform flow distribution generated in the initial state. In addition, swirling streams increase to provide more complicated streams for the following reasons.

The flow rate value that is outputted from the flow rate measuring device 1 in the initial state with neither dirt nor dust 5 deposited on the air filter 3 is a value detected measured by the flow rate detecting element 31, and the detected value is treated as a represented value of the flow rate in the induction pipe 20, which is regarded as the quantity of the air actually taken into the engine. The air cleaner 2, which is actually mounted onto various kinds of cars, is usually formed in an asymmetric three-dimensional unique shape as one example shown as a plan view and a side view in FIGS. 38(a) and 38(b) Since the air cleaner 2 has an inlet 2a and an outlet 2b formed at asymmetric positions thereon, the air entering the flow rate measuring device 1 not only has a deviation in the velocity distribution but also contains many swirling streams having a central axis in the flow direction. If the air filter is clogged, the asymmetry of the flow passage has become enhanced to increase the revolving component in the swirling streams.

To sum up, if the air filter 3 is clogged, the disturbing degree increases to enhance the noise in output values, the distribution in the non-uniform flow distribution changes, and the revolving component in the swirling streams alter to change the centrifugal force by the rotation, modifying the flow velocity distribution. As a result, the flow rate that is detected at the flow rate detecting element 31 changes, creating a problem to produce an error in flow rate detection.

Since the dirt and dust accumulated on the air filter 3 gradually increases according to the length of the running time of the engine in general, the introduction system changes with the lapse of time. When the air cleaner 2 that has changed with the lapse of time is used, the flow rate measuring device 1 produces an error in detection to fail optimized control of an air-fuel ratio. As a result, the purifying function in an exhaust emission control system, such as a three-way catalyst, is adversely affected to introduce serious air pollution. The three-way catalyst is one that can provide the best purifying efficiency with respect to nitrogen oxides $NO_x$, hydrocarbon HC and carbon monoxide CO in such a state that the air-fuel ratio is controlled in optimized fashion. The emission regulation has been determined to be severer throughout the world for the twenty-first century, and an issue of a change in the introduction system with the lapse of time is predicted to become a big issue more and more.

In addition, a change in the introduction system with the lapse of time, variations in the assemblage of the air filter 3 or the air cleaner 2 change the flow velocity distribution in the air flow to create a problem in that an error in flow rate detection is produced. It is the task of the flow rate measuring device 1 to detect a flow rate correctly irrespectively of the structure of a flow passage or the structure of an induction system.

Prior Art 1

As a technique to solve the disadvantage, there has been proposed a flow rate measuring device as first prior art, which has been disclosed in JP-A-8313138 as shown in FIG. 39. In this FIG., reference numeral 31 designates a flow rate detecting element, reference numeral 141 designates an intake air temperature detecting element, reference numeral 142 designates a rectifying grid for rectifying air flow, reference numeral 20 designates an induction pipe as a principal fluid passage, and reference numeral 140 designates a measuring duct. The measuring duct 140, which is formed in a cylindrical shape and is a size smaller than the diameter of the induction pipe 20, is provided in the principal fluid passage to extend in the flow direction. The measuring duct has an upstream side bell-mouthed. The flow rate detecting element 31 is provided in the measuring duct 140. The rectifying grid 142 is provided on an upstream side of the measuring duct to rectify the air flow. The rectifying grid 142 has a thickness in the flow direction and is formed in a so-called honeycomb shape.

By this arrangement, the intake air has swirling components removed therefrom when passing through the rectifying grid 142, and the intake air is collected from a wide range to be contracted when passing through the measuring duct 140 with the bell-mouthed introduction port. Even if the induction system, in particular, the air filter, changes with the lapse of time to alter the swirling streams or the non-uniform flow distribution in the air flow entering the flow rate measuring device, or to increase the disturbing degree, an error in flow rate detection can be minimized.

Since the measuring duct 140 can extend in the flow direction to introduce a part of the flow in the induction pipe 20 directly thereinto, a change in the flow can be sensitively detected.

However, the provision of the bell-mouthed cylindrical duct introduces a disadvantage in that the formation of a swirling stream is not taken into account though a decreasing effect to a non-uniform flow distribution or a disturbing degree is taken account to some extent. Under the vorticity conservation law described in articles on hydrodynamics, the revolution of a swirl increases as the revolving radius becomes smaller. In other words, when air flow is introduced into the measuring duct 140 to gradually decrease the revolving radius as shown in FIG. 40, the revolution of a swirling stream increases. When the revolution increases, a fluid in the measuring duct 140 has a distribution deviated toward outside by a centrifugal force to create a disadvantage in that a significant error in flow detection is produced at the flow rate detecting element 31 provided in the vicinity of the center of the measuring duct.

In order to solve this disadvantage, the first prior art adopts the rectifying grid 142 shown in FIG. 39. However, dense mounting of parts into an engine room is difficult to ensure a sufficient space for a pipe with the rectifying portion, and the demand for a plug-in type flow rate measuring device, which can be simply provided in an opening formed in the induction pipe 20, has become gradually greater in recent years. Since such a plug-in type flow rate measuring device has no rectifying function therein, there has been created a disadvantage in that a rectifying grid 142 is required to be provided in an introduction passage in addition to the flow rate measuring device.

Prior Art 2

In FIG. 41 is shown a vertical cross-sectional view of the flow rate measuring device in second prior art, which has been disclosed in JP-A-2232524. In FIG. 42 is shown a front view of the device as viewed from the a upstream side thereof.

In these FIGS., reference numeral 171 (171*a*, 171*c* and 171*d*) designates a subpassage as a detour, or a measuring duct, reference numeral 174 designates a recessed portion formed at an inlet of the measuring duct 171, reference numeral 162*a* designates an intake air temperature detecting element, reference numeral 162*b* designates a flow rate detecting element, reference numeral 180 designates an arrow to indicate the flow direction of the intake air, and reference numeral 170*a* designates an elliptical opening edge.

The measuring duct 171 as a detour has the elliptical edge 170*a* formed at the entire circumference of an upstream inlet opening thereof, and the inlet of the measuring duct is provided in the recessed portion 174.

This publication describes that such an arrangement can stabilize an airflow by the provision of the recessed portion. However, the arrangement has created a disadvantage in that the presence of a bent portion, where the flow is introduced from the recessed portion 174 into the measuring duct 171, causes separation in the flow to generate irregular vortexes, and that the irregular vortexes move downstream in the measuring duct 171 and collide with the flow rate detecting element 162*b* to increase noise and to produce an error in flow rate detection.

In addition, the measuring duct 171 has a great airflow resistance therein because of the detoured shape. When the flow in an induction pipe is suddenly accelerated, or when the accel pedal on a car is pressed down, it takes some time to expel the air in the measuring duct 171 by the presence of such a great airflow resistance. As a result, there has been created another disadvantage in that the flow rate detecting element 162*b* in the measuring duct 171 cannot sensitively detect a change in the flow.

In FIG. 43 is shown a vertical cross-sectional view of another flow rate measuring device disclosed in this publication, wherein a measuring duct extends in the flow direction without detouring. In this FIG., reference numeral 102 designates the measuring duct as a subpassage, reference numeral 104 designates a recessed portion and reference numeral 105 designates a check valve.

The flow rate measuring device that has the measuring duct 102 extended in the flow direction has also created a similar problem in that the presence of a bent portion, where the flow is introduced from the recessed portion 104 into the measuring duct 102, causes separation in the flow to generate irregular vortexes, and that the irregular vortexes move downstream in the measuring duct 102 and collide with the flow rate detecting element 162*b* to increase noise and to produce an error in flow rate detection.

In addition, the measuring duct 102 has a great air flow resistance therein because of the provision of the check valve 105. When the flow in an induction pipe is suddenly accelerated, or when the accel pedal on a car is pressed down, it takes some time to expel the air in the measuring duct 102 by the presence of such a great air flow resistance. As a result, there has been created a similar disadvantage in that the flow rate detecting element 162*b* in the measuring duct 102 can not sensitively detect a change in the flow.

Prior Art 3

In FIG. 44 is shown a vertical cross-sectional view of the flow rate measuring device in third prior art, which has been disclosed in JP-A-10142020. In FIG. 45 is shown a cross-sectional view taken along the line 45—45 of FIG. 44. In these FIGS., reference numeral 130 designates a measuring passage or a measuring duct, reference numeral 120 designates arrows to indicate the flow direction, reference numeral 129 designates a mounting member, reference numeral 121 designates two measuring elements or two flow rate detecting elements, reference numeral 131 designates a turning passage or a detouring measuring duct, reference numeral 142 designates a rounded interface, reference numeral 139 designates a side surface of the measuring passage, reference numeral 103 designates a seal ring, and reference numeral 108 designates an induction pipe.

The mounting member 129, which has the flow rate detecting element 121 and the flow rate detecting element 121 mounted thereon, is provided in the measuring duct 130. The measuring duct 130 has an inlet formed in a smooth curved shape. The measuring duct is formed so as to gradually narrow in the thickness direction of the mounting member 129.

It is estimated that the flow toward the measuring duct 130 is contracted by the curved surface in the vicinity of the inlet and is introduced into the measuring duct in such an arrangement. However, there has been created a disadvantage in that when a swirling stream enters the measuring duct 130 from upstream, separation caused by collision of the stream with a front end of the mounting member 129 generates irregular vortexes and the vortexes collide with the flow rate detecting element 121 to produce an error in flow rate detection.

The inlet of the measuring duct 130 collects only a few of portions of the fluid passing in the induction pipe 108. The measuring duct fails to introduce the flow so as to collect it toward the detectors of the flow rate detecting elements 121 as seen from the cross-sectional view of FIG. 44. The measuring duct is formed so as to collect the flow in the thickness direction of the mounting member 129 as shown in FIG. 45. As a result, there has been created a disadvantage in that an error in flow direction is produced with respect to a change in the flow velocity distribution in the vertical direction in FIG. 44.

In addition, the measuring duct 130 has a great air flow resistance therein because of the detoured shape. When the flow in the induction pipe is suddenly accelerated, or when the accel pedal on a car is pressed down, it takes some time to expel the air in the measuring duct 130 by the presence of such a great air flow resistance. As a result, there has been created another disadvantage in that the flow rate detecting elements 121 in the measuring duct 130 can not sensitively detect a change in the flow.

Since the conventional flow rate measuring devices are constructed as stated, the conventional devices have created the following disadvantages:

The presence of a bent portion in an induction system, or variations in assemblage of an air filter or an air cleaner change the velocity distribution of a flow to produce an error in flow rate detection.

When a change in an induction system with the lapse of time is caused by the clogging of an air filter, a non-uniform flow distribution or a swirling stream changes in the induction pipe, or when a disturbing degree increases, an error in flow detection is produced.

A change in a flow can not be detected in sensitive fashion.

SUMMARY OF THE INVENTION

The present invention is provided to eliminate the disadvantages of the prior art proposed to the typical problems to the induction system stated earlier.

It is an object of the present invention to provide a flow rate measuring device capable of being hardly susceptible to occurrence of an error in flow rate detection even when the presence of a bent portion in an induction system, or variations in assemblage of an air filter or an air cleaner change the velocity distribution in a flow, or a change in an induction system with the lapse of time due to the clogging of an air filter occurs to alter a non-uniform flow distribution or a swirling stream, or to increase a disturbing degree.

It is another object of the present invention to provide a flow rate measuring device capable of minimizing noise and being responsible to a change in a flow velocity though the device has the flow introduced directly into a flow rate detector thereof.

According to a first aspect of the present invention, there is provided a flow rate measuring device comprising a post to be provided in a fluid passage for passing a fluid flow so as to extend across a part of the fluid flow, a measuring duct formed in the post and a flow rate detector provided in the measuring duct, wherein the measuring duct has a fluid introduction port formed in an elongated shape and confronted a flow direction of the flow, the measuring duct is contracted so as to have at least a portion thereof between the fluid introduction port and the flow rate detector substantially smoothly narrowed toward a downstream direction of the flow in a longitudinal direction of the elongated shape, and wherein the measuring duct has at least the portion formed into a single hole.

According to a second aspect of the present invention, there is provided a flow rate measuring device comprising a post to be provided in a fluid passage for passing a fluid flow so as to extend across a part of the fluid flow, a measuring duct formed in the post and a flow rate detector provided in the measuring duct, wherein the measuring duct has a fluid introduction port formed in an elongated shape and confronted a flow direction of the flow, the measuring duct is contracted so as to have at least a portion thereof between a location upstream the flow rate detector and the flow rate detector substantially smoothly narrowed toward a downstream direction of the flow in a longitudinal direction of the elongated shape, and wherein the flow rate detector comprises a substantially plate-shaped mounting member substantially extending along the flow direction and in substantially parallel with a longitudinal direction of the fluid introduction port, and a flow rate detecting element carried on a main surface of the mounting member.

According to a third aspect of the present invention, there is provided a flow rate measuring device comprising a post to be provided in a fluid passage for passing a fluid flow so as to extend across a part of the fluid flow, a measuring duct formed in the post and a flow rate detector provided in the measuring duct, wherein the measuring duct has a fluid introduction port formed in an elongated shape and confronted a flow direction of the flow, the measuring duct is contracted so as to have at least a portion thereof between the fluid introduction port and the flow rate detector substantially smoothly narrowed toward a downstream direction of the flow in a longitudinal direction of the elongated shape, wherein the measuring duct has at least the portion formed into a single hole, and wherein the flow rate detector comprises a substantially plate-shaped mounting member substantially extending along the flow direction and in substantially parallel with the longitudinal direction of the fluid introduction port, and a flow rate detecting element carried on a main surface of the mounting member.

According to a fourth aspect of the present invention, the measuring duct extends substantially linearly in a direction from an upstream side of the fluid passage toward a downstream side of the fluid passage in any one of the first through third aspects.

According to a fifth aspect of the present invention, the fluid introduction port has a longitudinal length in the longitudinal direction and a transverse length in a transverse direction, and the longitudinal length is substantially at least twice the transverse length in any one of the first through fourth aspects.

According to a sixth aspect of the present invention, the measuring duct has an inner wall surface contracted toward the downstream direction so that at least a portion of an intersection between an imaginary plane perpendicular to the fluid introduction port and in parallel with the longitudinal direction of the fluid introduction port, and the inner wall surface is a substantially smooth curved line in any one of the first through fifth aspects.

According to a seventh aspect of the present invention, the smooth curved line is a substantially continuous curved line including a point of inflection in the sixth aspect.

According to an eighth aspect of the present invention, the curved line is a cubic function line or a line substantially approximate to a cubic function line in the seventh aspect.

According to a ninth aspect of the present invention, the point of inflection is located at a position that is apart from the fluid introduction port toward the downstream direction by a distance of substantially 0.3 L where the longitudinal length of the fluid introduction port is defined as L, in the seventh or eighth aspects.

According to a tenth aspect of the present invention, the measuring duct is contracted up to at least a position where an upstream end of the flow rate detector is located in any one of the first through sixth aspects.

According to an eleventh aspect of the present invention, the measuring duct is contracted up to at least a position where a flow rate detecting element of the flow rate detector is located in any one of the first through sixth aspects.

According to a twelfth aspect of the present invention, the fluid introduction port is formed in a curved shape in any one of the first through sixth aspects.

According to a thirteenth aspect of the present invention, the measuring duct has at least a portion thereof from a location upstream the flow rate detector to the flow rate detector substantially smoothly narrowed toward the downstream direction in a transverse direction of the fluid introduction port in any one of the first through sixth aspects.

According to a fourteenth aspect of the present invention, the measuring duct has a downstream wall end formed with a notch in any one of the first through sixth aspects.

According to a fifth aspect of the present invention, the measuring duct has an outer wall surface formed with a convexity at a position near and upstream the notch in the fourteenth aspect.

According to a sixth aspect of the present invention, the measuring duct has at least a portion of an outer wall surface formed in a curved or tapered surface expanded outwardly in any one of the first through sixth aspects.

According to a seventh aspect of the present invention, projections are provided near the fluid introduction port so as to extend toward an upstream direction in any one of the first through sixth aspects.

According to an eighteenth aspect of the present invention, the fluid introduction port is formed in a substantially rectangular shape, and the projections are provided at at least one pair of sides of long sides and short sides of the fluid introduction port, the projections being plate-shaped members in parallel with each other in the seventeenth aspect.

According to a nineteenth aspect of the present invention, the projections have a curved or tapered portion that has a wall thickness made thinner toward an upstream side of the fluid passage in the seventeenth or eighteenth aspect.

According to a twentieth aspect of the present invention, the post is inserted into the fluid passage through an opening formed in a side wall of the fluid passage in any one of the first through sixth aspects.

According to a twenty-first aspect of the present invention, the mounting member has a region with a wall thickness expanding from an upstream end of the mounting member toward the downstream direction, and the flow rate detecting element is provided on the region in any one of the second through sixth aspects.

According to a twenty-second aspect of the present invention, the mounting member has a downstream end formed with a notch in any one of the second through sixth aspects.

In accordance with the first aspect, a swirling vortex is divided into a plurality of vortexes at the elongated introduction port, and the divided vortexes are contracted and have rotation strengthened during passing through the single measuring duct. While the rotation is strengthened, adjacent vortexes have rotary energy weakened by friction each other. In addition, the scale of the vortexes can be made smaller. Thus, the rotary energy of the swirling vortexes is weakened, and a non-uniform flow distribution is corrected by the contraction to reduce a disturbing degree. Further, the occurrence of separation regions can be reduced to carry out flow rate measurement with good accuracy and minimized noise in the flow rate measuring device.

In accordance with the second aspect, a swirling vortex is divided into a plurality of vortexes at the elongated introduction port, and the divided vortexes are contracted and have rotation strengthened during passing through the single measuring duct. While the rotation is strengthened, adjacent vortexes have rotary energy weakened by friction each other. In addition, the scale of the vortexes can be made smaller. Thus, the rotary energy of the swirling vortexes is weakened, and a non-uniform flow distribution is corrected by the contraction to reduce a disturbing degree. The swirling vortexes divided by the mounting member have the rotary energy further weakened. When the swirling vortexes collide with a tip of the mounting member, separation can be avoided. Thus, the flow rate measuring device can carry out flow rate measurement with good accuracy and minimized noise.

In accordance with the third aspect, a swirling vortex is divided into a plurality of vortexes at the elongated introduction port, and the divided vortexes are contracted and have rotation strengthened during passing through the single measuring duct. While the rotation is strengthened, adjacent vortexes have rotary energy weakened by friction each other. In addition, the scale of the vortexes can be made smaller. Thus, the rotary energy of the swirling vortexes is weakened, and a non-uniform flow distribution is corrected by the contraction to reduce a disturbing degree. The swirling vortexes divided by the mounting member have the rotary energy further weakened. The occurrence of separation regions can be reduced between the introduction port and the flow rate detector. Thus, the flow rate measuring device can carry out flow rate measurement with good accuracy and minimized noise.

In accordance with the fourth aspect, a change in a flow can be sensitively detected.

In accordance with the fifth aspect, the effect that a swirling vortex is divided into a plurality of vortexes at the introduction port and the divided vortexes have swirling components weakened while moving downstream can be further enhanced.

In accordance with the sixth aspect, the flow that passes through the measuring duct can be smoothly contracted to carry out flow rate measurement with better accuracy.

In accordance with the seventh aspect, the flow that passes through the measuring duct can be more smoothly contracted to carry out flow rate measurement with better accuracy.

In accordance with the eighth aspect, the flow that passes through the measuring duct can be more smoothly contracted to carry out flow rate measurement with better accuracy.

In accordance with the ninth aspect, the flow that passes through the measuring duct can be far more smoothly contracted to carry out flow rate measurement with better accuracy.

In accordance with the tenth aspect, separation is restrained when the flow that is passing through the measuring duct collides with the flow rate detector. In addition, the flow that passes on a surface of the flow rate detecting element can be stabilized to carry out flow rate measurement with better accuracy.

In accordance with the eleventh aspect, the flow that passes on a surface of the flow rate detecting element can be further stabilized to carry out flow rate measurement with much better accuracy.

In accordance with the twelfth aspect, the flow can be smoothly introduced from the introduction port into the measuring duct to carry out flow rate measurement with better accuracy.

In accordance with the thirteenth aspect, the measuring duct can prevent the transverse cross-section at the downstream portion thereof from being formed in a shape with equal lengths in the longitudinal and transverse directions. As a result, swirling vortexes can be easily damped, and a high contraction ratio can correct a non-uniform flow distribution more effectively and can further reduce a disturbing degree, carrying out flow rate measurement with better accuracy and more minimized noise.

In accordance with the fourteenth aspect, a stream that has passed through the measuring duct and streams that have passed outside the measuring duct can be smoothly merged at an exit port of the measuring duct to make generated vortexes divided into smaller pieces so as to restrain fluid vibration, stabilizing the stream in the measuring duct. Thus, flow rate measurement can be carried out with better accuracy and more minimized noise.

In accordance with the fifteenth aspect, vortexes that are generated and made into smaller pieces when a stream through the measuring duct joins with streams outside the measuring duct can be sucked out of the measuring duct through the notch to prevent the vortexes from providing an obstacle to the advance of the streams. Thus, the fluid can be introduced into the measuring duct at a greater amount to carry out flow rate measurement with better accuracy.

In accordance with the sixteenth aspect, streams that pass along the outer wall surface can be made smooth to avoid separation, lowering pressure loss.

In accordance with the seventeenth aspect, a swirling stream that is directed to the introduction port arrives at the introduction port after having divided into a plurality of vortexes by the projections, and the divided vortexes are introduced into the measuring duct after having had the rotation weakened. Thus, flow rate measurement can be carried out with better accuracy.

In accordance with the eighteenth aspect, a swirling vortex can be ensured to be divided to carry out flow rate measurement with better accuracy.

In accordance with the nineteenth aspect, the fluid can be stably introduced at a greater amount to carry out flow rate measurement with better accuracy.

In accordance with the twentieth aspect, mounting of the flow rate measuring device to a plug-in type introduction system can be simplified to save a space required for an engine room and make an automobile assembling line highly effective.

In accordance with the twenty-first aspect, streams that pass along outer surfaces of the mounting member from a tip of the mounting member can be restrained from having separation generated therein. Thus, the streams that pass along surfaces of the flow rate detecting element can be further stabilized to carry out flow rate measurement with far better accuracy.

In accordance with the twenty-second aspect, a stream that has passed along a surface of the mounting member with the detecting element and a stream that has passed along the opposite surface of the mounting member without the detecting element gradually merge. The vortexes can be divided into smaller pieces to restrain the fluid vibration in the streams along the surfaces of the mounting member. Thus, the detecting element can measure flow rate stably to carry out flow rate measurement with good accuracy.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein;

FIG. 2 is a plan view of an example of the flow rate detecting element according to the first embodiment;

FIGS. 6(a) and 6(b) are a front view and a vertical cross-sectional view to show the structure and the operation of the flow rate measuring device according to the first embodiment;

FIGS. 7(a) and 7(b) are perspective views to explain an example of the inner wall surface profile of the measuring duct according to the first embodiment;

FIGS. 8(a) and 8(b) are perspective views to explain another example of the inner wall surface profile of the measuring duct according to the first embodiment;

FIGS. 9(a) and 9(b) rare a diagram to show the profile of a contracted nozzle used in a typical wind tunnel test and a curve to show a relationship between contraction ratios and disturbing degree damping ratios in the first embodiment;

FIGS. 12(a) and 12(b) are a schematic perspective view wherein the longitudinal length of a mounting member is directed to the same direction as that of the fluid introduction port of the measuring duct in accordance with the first embodiment, and a schematic perspective view wherein the longitudinal length of the mounting member is directed to a direction perpendicular to that of the fluid introduction port for comparison, in order to explain the fluid streams in vicinity of the mounting member according to the first embodiment;

FIG. 27 is a schematic view to show how fluid streams are created when a post, which has been cut at plane containing projections and extending toward the flow direction, is located in the fluid streams, in the fourth embodiment;

FIG. 28 is a vertical cross-sectional view of essential portions of the flow rate measuring device according to a fifth embodiment of the present invention, wherein the post, which is cut in a width direction thereof at a plane extending toward the flow direction, is located in the fluid streams;

FIGS. 32(a) and 6(b) are cross-sectional views of different shapes of the projections according to the sixth embodiment;

FIGS. 35(a) and 35(b) rare a front view and a vertical cross-sectional view to show a structure of the flow rate measuring device according to an eighth embodiment of the present invention;

DETAILED DESCRIPTION OF THE PREFERRED EMBODIMENTS

Embodiment 1

Figure 1:
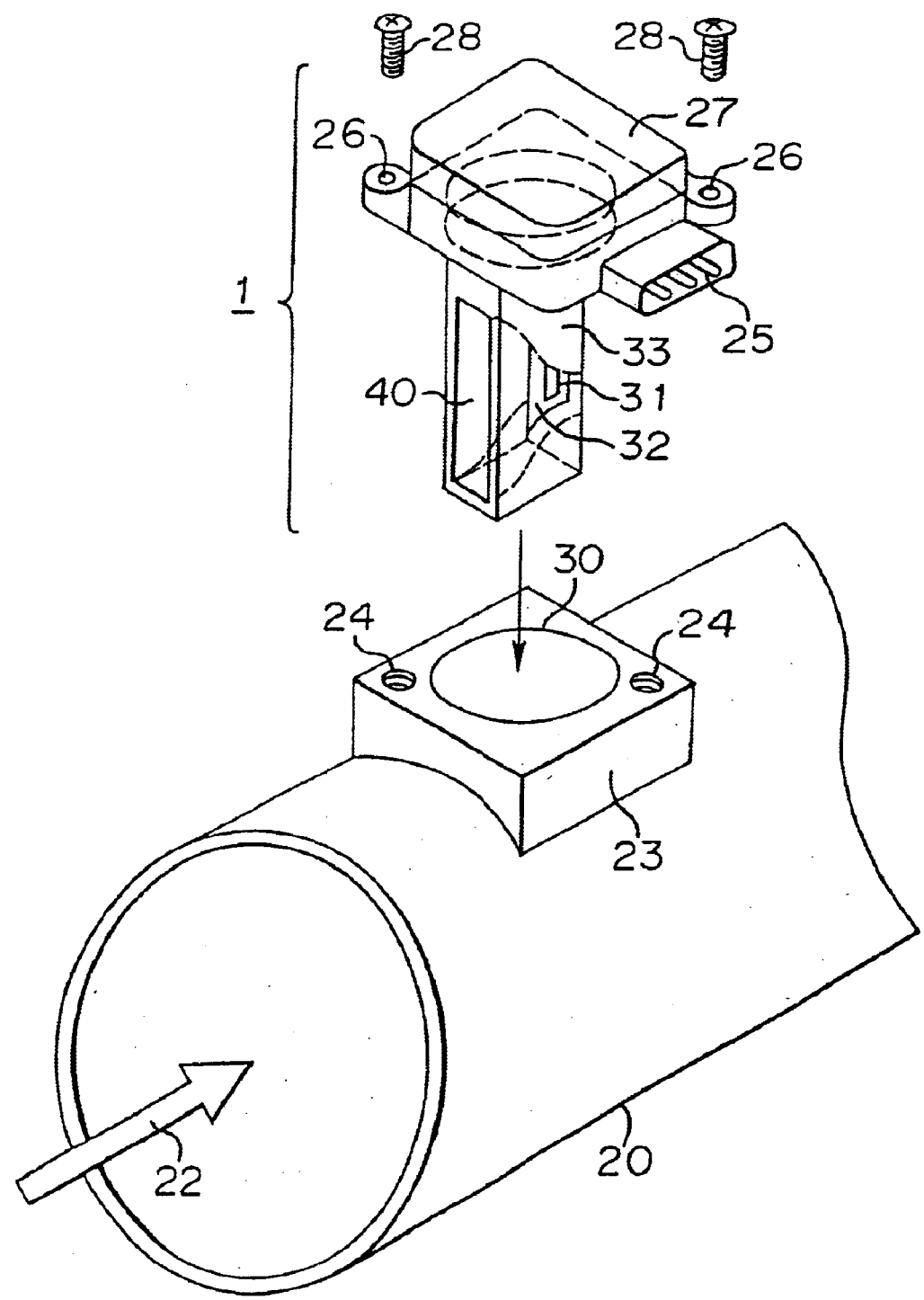
FIG. 1 is a perspective view of the flow rate measuring device according to a first embodiment of the present invention.
Figure 39:
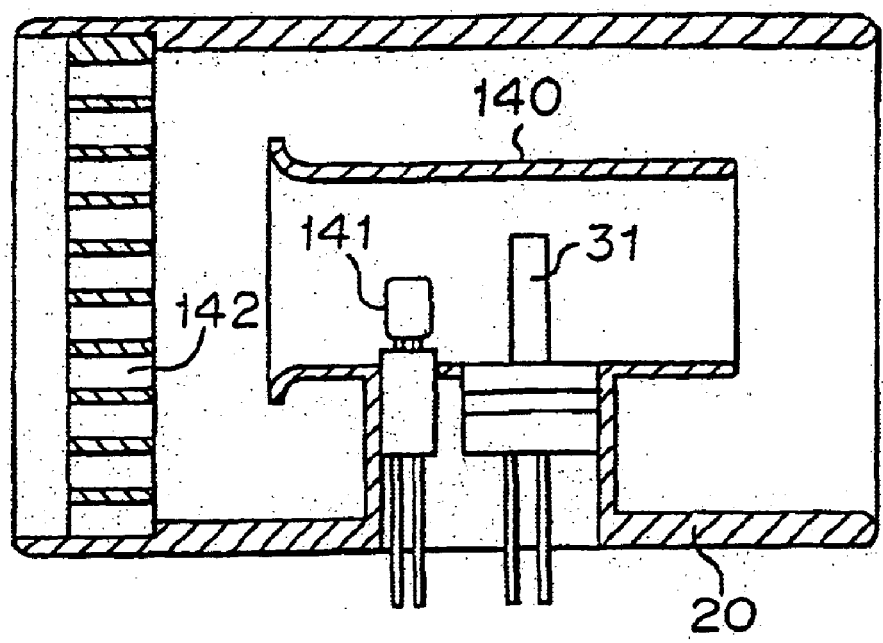
FIG. 39 is a cross-sectional view to show the structure of the flow rate measuring device in first prior art.

In FIG. 1 is shown a perspective view of the flow rate measuring device according to a first embodiment of the present invention. In this FIG., reference numeral 1 designates the flow rate measuring device, reference numeral 20 designates an induction pipe, reference numeral 22 designates an arrow to indicate the forward direction of intake air, reference numeral 23 designates a seat to mount the flow rate measuring device 1 to the induction pipe 20 by insertion, reference numerals 24 and 26 designate threaded holes to fixedly mount the flow rate measuring device 1 to the seat 23, reference numeral 28 designates bolts, reference numeral 25 designates a terminal for connection of signal lines, reference numeral 27 designates a cover for covering an electronic circuit board (not shown) arranged therein, reference numeral 30 designates an opening formed in the seat 23 and in a side wall of the induction pipe 20 for inserting the flow rate measuring device 1 into the induction pipe 20, reference numeral 31 designates a flow rate detecting element, and reference numeral 32 designates a substantially plate-shaped mounting member provided along the flow direction of a fluid. The mounting member 32 has the flow rate detecting element 31 held on one of main surfaces to provide a flow rate detector. Reference numeral 33 designates a post, and reference numeral 40 designates a measuring duct, which is provided by dig the post 33 in a certain shape. The flow rate measuring device 1 is of a so-called plug-in type, which can be inserted into the opening in the seat 23 and in the side wall of the induction pipe 20. Such an arrangement allows the flow rate measuring device to be easily mounted to the induction pipe 20 since it is enough to provide the hole 30 in the induction pipe 20 for mounting of the flow rate measuring device and since it is not necessary to cut the induction pipe and to connect the flow rate measuring device between the cut ends of the induction pipe as in the prior art shown in FIG. 39 for instance. When the flow rate measuring device is mounted to the seat and the induction pipe, the bolts 28 are screwed into the threaded holes 24 and 26, and a gap between the opening and the flow rate measuring device 1 is sealed by a sealing member (not shown) such as an O-ring, to prevent the intake air from leaking.

Now, the structure and the operation of an example of the flow rate detecting element 31 will be explained. In FIG. 2 is shown a plan view of the flow rate detecting element applicable to the first embodiment of the present invention. This flow rate detecting element is used for an internal combustion engine, which has been disclosed in JP-A-1185416. The flow rate detecting element comprises a substrate provided in the induction pipe so as to orient in parallel with the flow of the intake air, heating resistors made of heat-sensitive resistor film and provided on the substrate at upstream and downstream ends thereof in the flow direction of the intake air, and a comparator for electrically determining a difference between heat dissipation quantity from each of the upstream and downstream resistors to detect the flow direction of the intake air.

In FIG. 2, reference numeral 200 designates an arrow to indicate the normal air flow or the forward direction of the intake air, reference numeral 201 designates the substrate which has a small thickness and is made of plastic foil, reference numeral 202 designates a heat insulating hole which serves to avoid thermal interference between the heating resistors 203, 204 and heating resistors 205, 206 for temperature compensation, reference numeral 203 designates the heating resistor provided on the upstream side of the intake air, reference numeral 204 designates the heating resistor provided on the downstream side of the intake air, reference numeral 205 designates the heating resistor for temperature compensation provided on the upstream side of the intake air, and reference numeral 206 designates the heating resistor for temperature compensation provided on the downstream side of the intake air. The heating resistors for temperature compensation 205, 206 detect a temperature of the intake air to control the heating temperatures of the heating resistors 203, 204.

By such an arrangement, flowing of the air creates a difference in heat dissipation between the upstream heating resistor 203 and the downstream heating resistor 204, and the flow direction and the flow velocity of the air can be detected based on the difference.

Figure 3A:
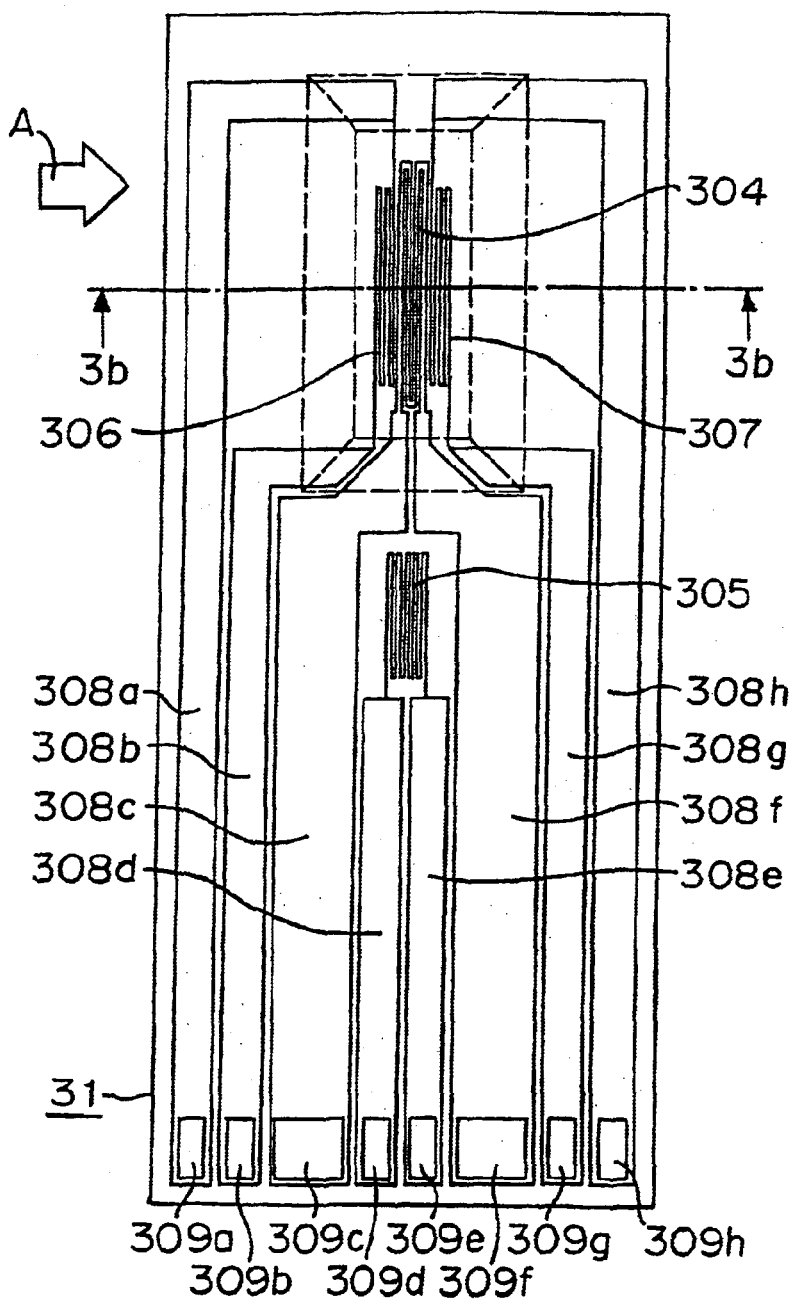
FIGS. 3(a) and 3(b) are a plan view and a cross-sectional view taken along the line 3b—3b of the FIG. 3(a) of another example of the flow rate detecting element of the first embodiment.
Figure 3B:
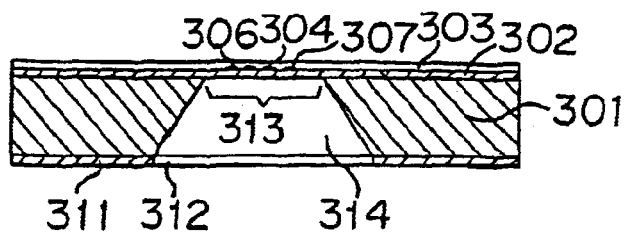

Next, the structure and the operation of another example of the flow rate detecting element 31 will be explained. In FIGS. 3(*a*) and 3(*b*) ware shown a plan view of the flow rate detecting element as the second example applicable to the first embodiment of the present invention and a cross-sectional view taken along the line 3*b*—3*b* of FIG. 3(*a*). In this FIG., reference numeral 301 designates a planar substrate, which is made of silicon and has a wall thickness of about 0.4 mm for instance, and which has an insulating supporting film 302 of silicon nitride or similar one formed thereon so as to have a thickness of, e.g., 0.5 $\mu$m by sputtering, evaporation, CVD (Chemical Vapor Deposition) or an other technique. The supporting film has a resistor 304 and temperature detecting resistors 306, 307 made of heat-sensitive resistor films of platinum or similar substance so as to have a thickness of, e.g., 0.1 $\mu$m by evaporation, sputtering or an other technique. Connection patterns 308*a*–308*c* and 308*f*–308*h* as electrical current paths for the heating resistor 304 and the temperature detecting resistors 306, 307 are formed by a photoengraving process, wet etching process, a dry etching process or an other process.

The supporting film also has a fluid temperature detector 305 made of a heat-sensitive resistor film of platinum deposited thereon so as to have a thickness of 0.1 $\mu$m by evaporation, sputtering or a similar process. Lead patterns 308*d*, 308*e* for the fluid temperature detector 305 are formed by a photoengraving process, a wet etching process, a dry etching process or a similar process. The heating resistor 304 and the temperature detecting resistors 306, 307 have an insulating protect film 303 made of nitride silicon or similar substance deposited thereon so as to have a thickness of, e.g., 0.5 $\mu$m by sputtering, CVD or a similar process.

The heating resistor 304 is connected to electrodes 309*c*, 309*f* through the connection patterns 308*c*, 308*f* in series connection with the heating resistor to provide electrical connection with external devices. The fluid temperature detector 305 is connected to electrodes 309*d*, 309*e* through the lead patterns 308*d*, 308*e* to provide electrical connection with external devices.

The temperature detecting resistor 306 is connected to electrodes 309*a*, 309*b* through the connection patterns 308*a*, 308*b*. The temperature detecting resistor 307 is connected to electrodes 309*g*, 309*h* through the connecting patterns 308*g*, 308*h*.

The electrodes 309*a*–309*h* have the protection film 303 removed for electrical connection with external devices by wire bonding or a similar technique.

The planar substrate 301 has a protective film 311 deposited on a rear surface opposite to the surface with the supporting film 302 deposited. The protected film on the rear surface has an etched hole 312 formed therein by a photoengraving process or a similar process. A portion of the planar substrate 301 is removed by alkali etching or a similar process to form a cavity 314 so as to provide a flow rate detecting diaphragm 313 as the flow rate detector.

An arrow A indicates a positive direction of the flow of a fluid to be measured, and the flow rate diaphragm 313 is provided so as to be exposed to the flow of the fluid to be measured.

The diaphragm 313 measures 1,000 $\mu$m×2,000 $\mu$m and has a thickness of 1 $\mu$m at a portion without the resistors 304, 306 and 307 provided.

Figure 4:
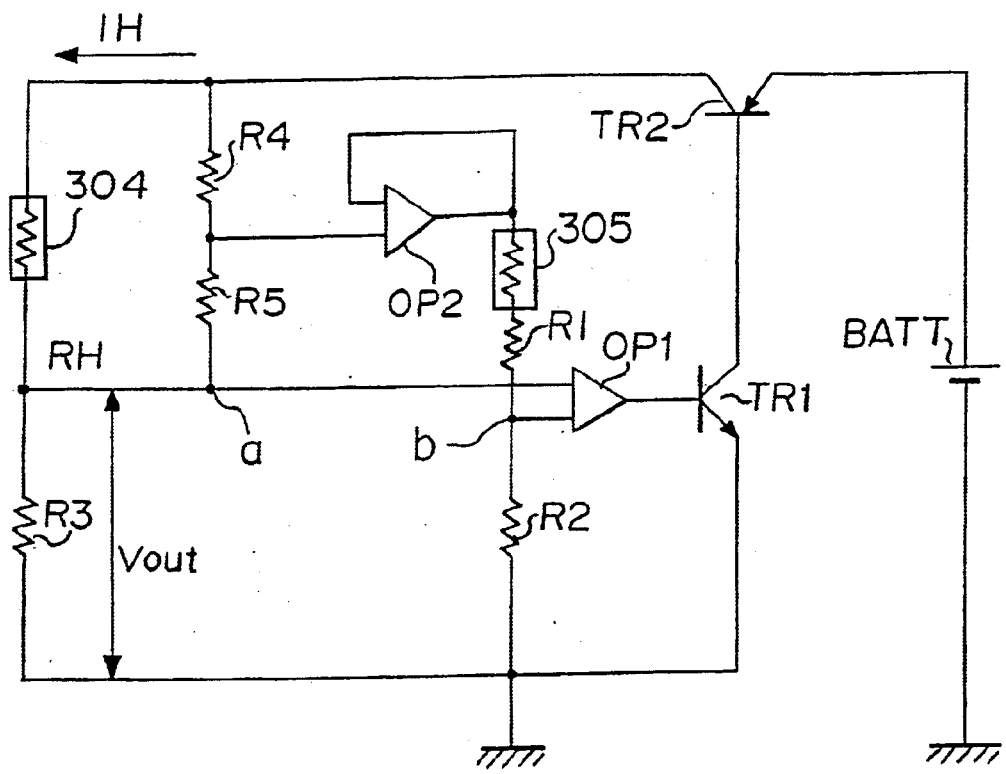
FIG. 4 is a diagram of a circuit applicable to the flow rate detecting element of FIG. 3.

The heating resistor 304 is controlled by a circuit for providing a constant temperature difference shown in FIG. 4 so as to have such a resistance value to provide a certain average temperature. The detection circuit is a bridged circuit including the fluid temperature detector 305 and the heating resistor 304. In this FIG., references R1, R2, R3, R4 and R5 designate fixed resistor, references OP1 and OP2 designate operational amplifiers, references TR1 and TR2 designate transistors, and references BATT designates a power source.

The detection circuit controls a heating current IH in the heating resistor 304 by serving so as to equalize the potentials at points "a" and "b" in this FIG. When the flow velocity of the fluid to be measured becomes faster, the heat transferring quantity from the heating resistor 304 to the fluid becomes greater to increase the heating current IH in order to maintain the average temperature of the heating resistor 4 at the constant value.

On the other hand, the temperature detecting resistors 306, 307 are served to obtain outputs corresponding to temperatures of the respective resistors by a circuit (not shown), and the difference between the outputs is found to provide an output from the flow rate sensor. In other words, when the fluid moves in the direction indicated by A, the temperature of the temperature detecting resistor 306 lowers while the temperature of the temperature detecting resistor 307 does not lower as much as the temperature detecting resistor 306.

Figure 5:
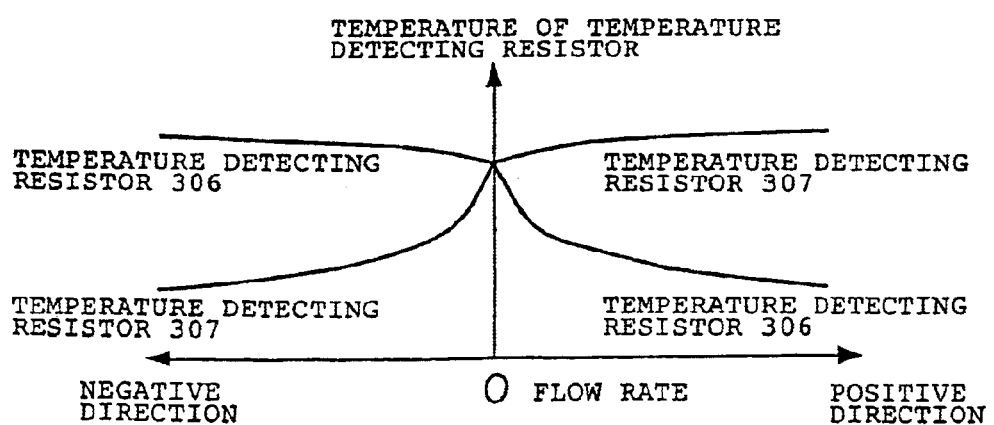
FIG. 5 is a graph to show a relationship between detected flow rates and temperature measuring resistors in the flow rate detecting element of FIG. 3.

In FIG. 5 is shown a relationship between the temperatures of the temperature detecting resistors 306, 307 and flow rates. The flow rates and directions of the flow can be detected by using differences between outputs corresponding to temperatures of the temperature detecting resistors 306 and 307 as outputs from the flow rate sensor.

In order to detect the temperatures of the temperature detecting resistors 306, 307, there is a method to apply a certain constant voltage or a certain constant current to each of the temperature detecting resistors 306 and 307.

Although explanation of this embodiment has been made with respect to the flow rate detecting element 31 which can detect the flow rate in both directions of a forward direction and a backward direction, the present invention is not limited to such a type of device, and the flow rate detecting element may have a simple structure to carry out the detection function only in the forward direction.

The flow rate detecting element may not be of a heat-sensitive type, and may be formed in a different detecting type.

In FIGS. 6(a) and 6(b) are shown a plan view and a vertical cross-sectional view to show the structure and the operation of the flow rate measuring device according to the first embodiment of the present invention. In these FIGS., reference numeral 29 designates the sealing member, such as an O-ring, to seal the gap between the hole 30 in the induction pipe 20 and the flow rate measuring device 1, reference numerals 34, 35 and 36 designate arrows to indicate streams of the fluid, reference L designates a longitudinal length of a fluid introduction port 41 of the post 33 and reference M designates a transverse length of the post.

Reference numeral 33 designates the post, which is provided in the induction pipe 20 so as to project into a part of the flow. The post 33 has the measuring duct 40 formed therein to linearly extend from the introduction port 41 as a fluid inlet to a fluid exit port 412 as a fluid outlet in a direction from an upstream side toward a downstream side of the induction pipe 20 as the fluid passage. The fluid introduction port 41 of the measuring duct 40 is formed in an elongated shape or in a rectangular shape in this embodiment. The fluid introduction port 41 confronts the fluid in the induction pipe 20 as the fluid passage in the flow direction. The fluid introduction port has the longitudinal length or long sides directed along a diametrical direction of the induction pipe 20 in a cylindrical shape. The center of a cross-section of the measuring duct 40 perpendicular to the flow direction of the flow substantially conform with the center of a cross-section of the induction pipe 20 perpendicular to the flow direction of the flow. Although the cross-section of the measuring duct 40 in the direction perpendicular to the flow is shown to be in a rectangular shape, the corners of the rectangular section may be rounded or chamfered, and the cross-section of the measuring duct may be formed in an elliptical or oval form.

In this embodiment, the measuring duct 40 has the long sides in section contracted form the introduction port 41 to the exit port 42 so as to substantially smoothly narrow toward the downstream direction. Reference numeral 45 designates a restricted portion of the measuring duct, and reference numeral 50 designates a point of inflection in the restricted portion.

In FIGS. 7(a) and 7(b) are shown a perspective view to explain a relationship between an imaginary plane 83 perpendicular to the fluid introduction port and in parallel with the longitudinal direction of the fluid introduction port, and a perspective view to show a cross-section of the flow rate measuring device cut by the imaginary plane 83 in order to describe the shape of the inner wall surface of the measuring duct. In these FIGS., reference numeral 84 designates an intersection between the imaginary plane 83 and the inner wall surface of the measuring duct 40.

The intersection has at least a portion thereof made in smooth curved line, is substantially continuous, including the point of inflection. The curved line is a line substantially approximate to a cubic function line.

Although this embodiment refers to the profile of the intersection 84 between the inner wall surface and the plane 83, this embodiment also covers another intersection 84 between the inner wall surface and another imaginary plane as shown in FIGS 8(a) and 8(b).

The point of inflection 50 is located at a position that is apart from the fluid introduction port 41 toward the downstream direction by a distance of substantially 0.3 L where the longitudinal length of the fluid introduction port 41 is defined as L.

Although the explanation has been made with respect to a case wherein the intersection is a line substantially approximate to a cubic function, the advantages offered by this mode can not be taken away even if the intersection comprises a line substantially approximate to a cubic function and provided by a combination of a plurality of arcs.

The fluid introduction port 41 may be formed in a curve shape so as to provide rounded corners as shown in FIG. 8.

The substantially plate-shaped mounting member 32 is located so as to have the main surfaces separated from the inner wall surfaces of the measuring duct and extending along the flow direction of the fluid. The mounting member 32 has the detecting element 31 carried on the one main surface. In this embodiment, the entire mounting member 32 is located at the restricted portion in the measuring duct 40.

The detecting element 31 has a detector (e.g., the diaphragm 313 shown in FIG. 3) located at a middle point in a length of the measuring duct 40 with the detector located therein in parallel with the longitudinal direction of the fluid introduction port 41.

The mounting member 32 may be inserted into the measuring duct 40 through the opening in the measuring duct 40 from, e.g., an upper portion of the post 33 so as to be fixed at a certain position.

Now, the operation offered by contracting the measuring duct 40 will be explained. In FIG. 9(a) is shown a schematic view to explain the profile and the operation of a contracted nozzle to be used in a typical wind tunnel test. The profile shown is a cubic curve including a point of inflection. In this FIG., reference numeral 70 designates a nozzle dimension on the introduction port side (Distance=E), reference numeral 72 designates a nozzle dimension on the exit port side (Distance=F), reference numeral 74 designates an axial distance of the passage in the nozzle (Distance=G), reference numeral 76 designates the point of inflection, and reference numeral 78 designates a distance from the nozzle introduction port to the point of inflection in the flow direction (Distance=H).

When the intersection of the central axis of the nozzle and the plane perpendicular to the central axis at the nozzle introduction port is defined as the origin, the x-axis is defined so as to be directed from the nozzle introduction port toward the nozzle exit port, and the distance of the cubic curve from the x-axis is defined as R, the cubic curve is represented by the following formula, for instance:

In the case of $0 \leqq x \leqq H$ $$\frac{R}{F/2} = \frac{E}{F} - \left(\frac{E}{F} - 1\right) \cdot \frac{(x/G)^3}{(H/G)^3} \quad (1)$$

In the case of $H \leqq x \leqq G$ $$\frac{R}{F/2} = \frac{E}{F} - \left(\frac{E}{F} - 1\right) \cdot \frac{(1 - x/G)^3}{(1 - H/G)^3} \quad (2)$$

When the cross-sectional area in a passage is contracted, the disturbing degree at the exit port of the passage can be damped. When the ratio (S/R) of the area of a nozzle introduction port (=S) to the area of a nozzle exit port (=R) is defined as a contraction ratio (=C), and the ratio (=Q/P) of a disturbing degree at the nozzle exit port (=Q) to a disturbing degree at the nozzle introduction port (=P) is defined as a disturbing degree damping ratio, the relationship between the contraction ratio and the disturbing degree damping ratio is represented by the following formula:

$$J = \frac{1}{C} \times \left\{ \frac{\frac{1}{C^2} + 2C}{3} \right\}^{1/2} \quad (3)$$

In FIG. 9(b) is shown a curve representing the relationship between the contraction ratio and the disturbing degree damping ratio obtained in accordance with the formula (3).

In this embodiment, the contraction ratio is designed so as to be 4. The disturbing degree damping ratio J at this contraction ratio is about 0.4 according to the formula (3). The experiment, wherein a flow with a disturbing degree of 20% was actually provided from the upstream side, showed that the disturbing degree at the nozzle exit port was about 8%, which means that the disturbing degree occurred at the upstream side was reduced to 40% of the original value.

It was confirmed that when the position of the point of inflection 76 (H) satisfies the equation of H=0.3E, disturbance was reduced in the most effective way in this embodiment.

Next, the basic operation of the flow rate measuring device 1 will be explained. Referring to FIG. 6(b), a part of the air, which moves downstream from the air cleaner 2 toward the flow rate measuring device 1, is introduced into the measuring duct 40 as the streams 34 and flows along the surface of the flow rate detecting element 31. Another part of the air overflows outside the measuring duct 40 as the streams 35 after having entered the measuring duct 40. The remaining part of the air passes outside the measuring duct 40 as the stream 36 without entering the measuring duct.

The reason why the steams 35 are generated is that the flow resistance in the measuring duct 40 in a contracted form is greater than the flow resistance in a portion outside the measuring duct 40 without any obstacle included.

The streams 35 merge into the stream 36 and move downstream outside the measuring duct 40. The streams 34 flow along the surface of the flow rate detecting element 31, merge into the stream 36 at the exit port 42 of the measuring duct 40 and move downstream into an engine combustion chamber.

First, the flow rate detection error to swirling streams will be mainly explained. Second, the flow rate detection error to a non-uniform flow distribution or a disturbing degree will be explained. In order to consider only the movement of swirling streams, the flow rate detection error will be described by decomposing a flow velocity in the introduction pipe 20 into a velocity in parallel with the central axis of the introduction pipe 20 and a velocity on an imaginary plane perpendicular to the central axis of the introduction pipe 20, and taking out only the latter velocity.

Figure 10:
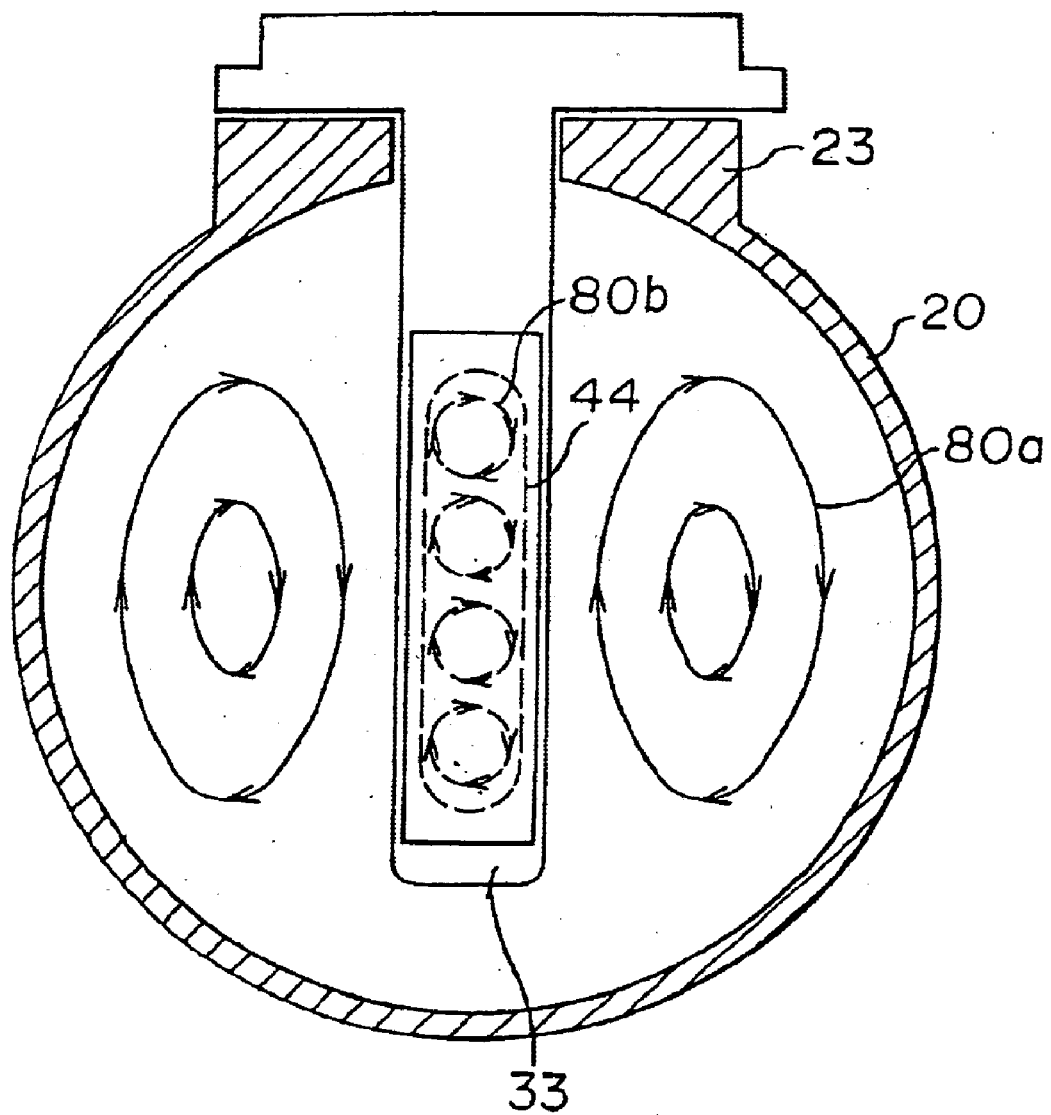
FIG. 10 is a schematic diagram to explain the movement of swirling streams on a plane perpendicular to the central axis of an induction pipe at an introduction port of the measuring duct according to the first embodiment.
Figure 11:
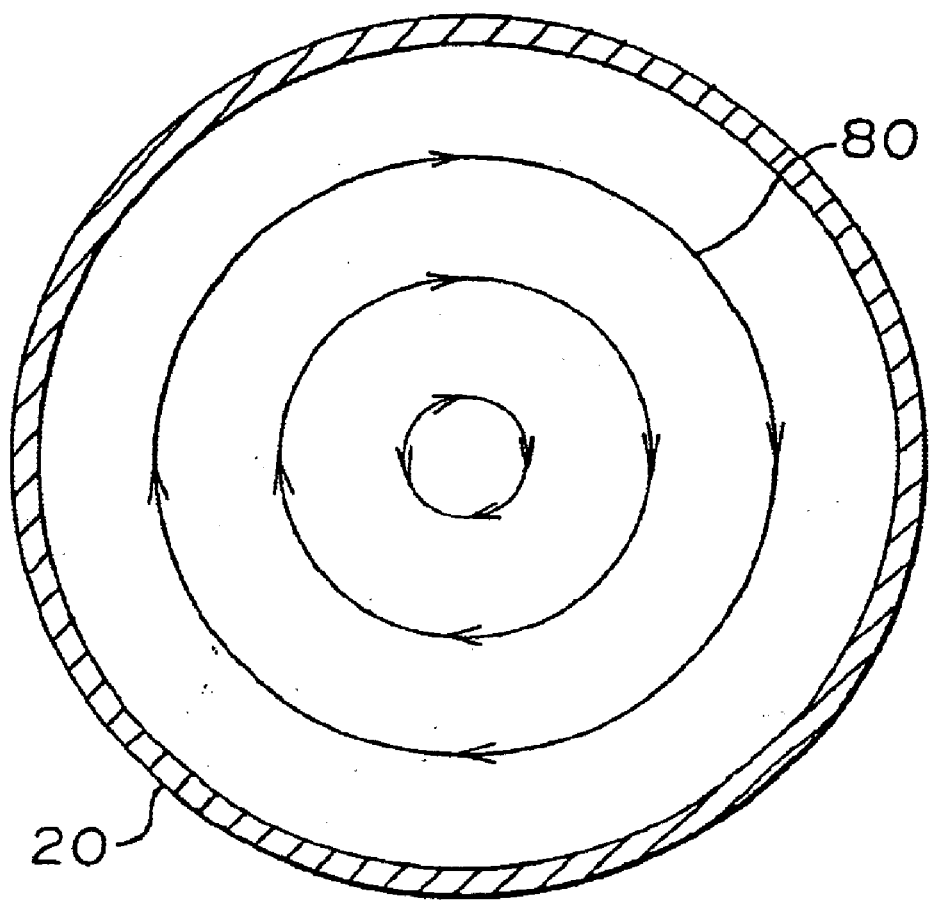
FIG. 11 is schematic diagram to show the movement of a swirling stream on a plane perpendicular to the central axis of the induction pipe at a portion downstream the outlet of an air cleaner and upstream the flow rate measuring device in the first embodiment.

In FIG. 10 is shown a schematic view to explain the movement of swirling streams on the imaginary plane perpendicular to the central axis of the introduction pipe 20 at the introduction port 41 of the measuring duct. In FIG. 11 is shown a schematic view to explain the movement of a swirling stream on an imaginary plane perpendicular to the central axis of the introduction pipe 20 and at a position downstream the outlet of the air cleaner and upstream the flow rate measuring device.

Although the swirling streams are created clockwise or counterclockwise according to the shape of the air cleaner 2 as viewed from the upstream side, explanation will be made with respect to a case wherein the swirling streams are created clockwise as viewed from the upstream side.

In FIG. 11 is, reference numeral 80 designates a vortex, which is represented by the swirling stream created at the air cleaner and moving toward the flow rate measuring device. The vortex 80 is separated by the post 33 to be divided into a plurality of vortexes 80a, 80b as shown in FIG. 10. Before the vortexes 80b are created, an elongated vortex 44 is created, as shown by a dotted line, at the rectangular introduction port 41 formed in the post 33 in the longitudinal direction. The elongated vortex 44 is further divided into the plural smaller vortexes 80b because the rotation in a substantially circular form is stabler to vortexes. The vortexes 80b, which have been divided in 4 pieces as shown in FIG. 10, have the rotation weaken together since the vortexes have opposite velocities at adjoining portions. After that, the streams can have a swirling component weakened, being gradually contracted by the measuring passage 40 formed by the smooth curved surfaces.

Now, the movement of the swirling vortexes during contraction will be explained. As stated earlier with respect to the first prior art, the provision of a bell-mouthed strengthens the rotation of vortexes during contraction to deviate the flow distribution in a circumferential direction, producing an error in flow rate measurement. Although the measuring duct 40 according to this embodiment is similar to the cylindrical bell-mouthed duct in that the rotation of the divided swirling vortexes 80*b* is strengthened during contraction, the measuring duct according to this embodiment is significantly different from the duct according to the first prior art in that the plural vortexes are adjacent with the rotation of the vortexes strengthened. When rotation is strengthened, the friction between adjacent vortexes 80*b* is enhanced to weaken the rotary energy of the adjacent vortexes. In addition, the swirling vortexes 80*b* can be made smaller by contraction. The vortical scale that is obtained when the magnitude of vortexes and the viscous force of the fluid are substantially balanced is called Kolmogorov length scale, which is a well-known fact in hydrodynamics. Specifically, it is known that as the vortical scale is made smaller, the rotary energy is converted into thermal energy by the viscosity of the fluid.

The fluid introduction port 41 is formed in an elongated shape, or an oblong shape to divide the swirling vortex 44, and when the divided swirling vortexes 80*b* can effectively have the energy damped with the revolution increased in the measuring duct 40 formed in a simple hole as a space without a partition or a similar member, the vortical scale is made smaller to convert the rotary energy into thermal energy. As a result, the divided swirling vortexes can be damped, and the non-uniform flow distribution can be corrected by contraction to reduce noise.

According to this embodiment, the swirling streams in the measuring duct 40 can be effectively contracted unlike a nozzle that has the entire wind tunnel contracted as stated with respect to FIG. 9.

The mounting member 32 whose longitudinal length is not less than twice the transverse length, is configured so as to bridge the restricted portion, where the measuring duct 40 has the longitudinal length contracted. Specifically, the mounting member 32 is provided so as to substantially extend in the flow direction of the fluid and in substantially parallel with the longitudinal direction of the fluid introduction port 41. In other words, the mounting member 32 has a longitudinal length 82 detected to the substantially same direction as the longitudinal length of the measuring duct 40 as viewed from the upstream side of the mounting member 32 as shown in FIG. 6(*a*). In FIG. 6(*a*), reference numeral 81 designates a transverse length of the mounting member 32, and reference numeral 82 designates the longitudinal length of the mounting member 32.

Now, the streams in the vicinity of the mounting member 32 will be explained, referring to FIGS. 12(*a*) and 12(*b*). In FIG. 12(*a*) is shown a case wherein the longitudinal direction 82 of the mounting member is directed to the same direction as the longitudinal direction L of the fluid introduction port of the measuring duct. In FIG. 12(*b*) is shown a case wherein the longitudinal direction 82 of the mounting member is directed to be perpendicular to the longitudinal direction L of the fluid introduction port. In the case shown in FIG. 12(*a*), the swirling vortexes 80*b*, which have been created as four divided vortexes at the fluid introduction port 41, have swirling components weakened during contraction, merge into two divided vortexes on the way to the mounting member 32, and are again divided into four vortexes by the mounting member 32 since the mounting member 32 bridges the measuring duct 40 in the longitudinal direction. In FIG. 12(*b*) is shown that the vortexes that have merged into two pieces are separated by the mounting member 32. In the case shown in FIG. 12(*a*), the arrangement that the mounting member 32 is located to divide the vortexes can further divide the vortexes, and adjacent swirling vortexes have the swirl weakened each other. On the other hand, in the case shown in FIG. 12(*b*), the arrangement that the mounting member 32 is located between the upper and lower divided vortexes can not make the swirling vortexes adjoined and can not work to weaken the swirl.

In the case of FIG. 12(*a*), the divided vortexes have the swirl weakened each other, contacting together. In the case of FIG. 12(*b*), the swirling components can not be weakened since the vortexes do not contact each other. It is clear that the arrangement of the mounting member 32 as shown in FIG. 12(*a*) is more effective than the arrangement of the mounting member 32 as shown in FIG. 12(*b*) to damp the swirls by the mounting member 32.

For this reason, the swirling vortexes can not be weakened when the measuring duct 40 includes a partition or a similar member in the same direction as the mounting member shown in FIG. 12(*b*).

Although the explanation has been made with respect to the case wherein the swirling vortex is divided into four vortexes at the fluid introduction port 41 for easy comprehension of the movement, the present invention is not limited to this case, and the number of the divided vortexes is arbitrary. The inventors experimentally proved that division of a vortex into not less than two vortexes was effective and division of a vortex into not less than three vortex was particularly effective in this embodiment, which is characterized in that the fluid introduction port 41 is formed in an elongated (oblong) shape. It is preferable that the value of the aspect ratio (longitudinal length/transverse length) of the fluid introduction port is not less than substantially 2, and it is particularly preferable that the value is not less than substantially 3. In this embodiment, the value is substantially 4. If the vortexes merge into an odd number of vortexes just before the mounting member 32 in the case of FIG. 12(*b*), the swirling stream reducing effect can be expected to some extent since the central vortex is divided by the mounting member 32.

Although the explanation has been made with respect to the case wherein the mounting member 32 completely bridges the restricted portion 45, the swirling stream reducing effect can be obtained to some extent even if the mounting member incompletely bridges the restricted portion.

Seemingly, it is more effective to insert the mounting member 32 into the measuring duct 40 at a position located more upstream the shown position in consideration of only the object to divide swirling vortexes. In that case, an effect to a non-uniform flow distribution stated earlier can not be obtained though the effect to swirling streams is enhanced. It is not effective that the mounting member 32 is inserted at a position located more upstream the shown position without considering other factors. It is quite important that the mounting member is located on the downstream side of the measuring duct 40 as in this embodiment in order to reduce an error caused by swirling streams, a non-uniform flow distribution and noise with good balance.

When the measuring duct is contracted up to at least an upstream edge or a tip of the mounting member 32 with the flow rate detecting element 31 carried thereon, the collision of a flow including swirling vortexes with the tip of the mounting member 32 hardly causes separation, allowing the flow rate detecting element 31 to carry out flow rate measurement in a stable way. When the measuring duct is not contracted up to at least the upstream edge or the tip of the mounting member 32, separation is caused at the tip of the mounting member 32 to generate disturbing streams, which arrive in the vicinity of the detector to provide an obstacle to stable flow rate measurement.

Figure 13A:
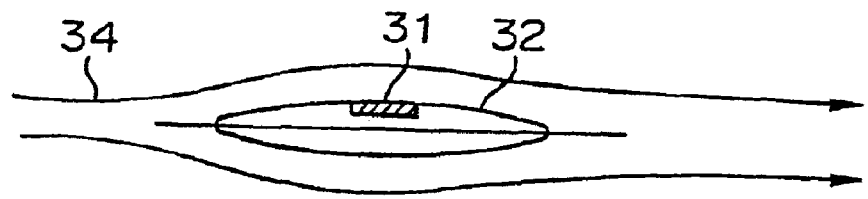
FIGS. 13(a) and 13(b) are a schematic view wherein the mounting member in a two-dimensional shape is located along fluid streams, and a schematic view wherein the mounting member is located so as to be inclined at an angle θ with the fluid streams, in order to explain the fluid streams in the vicinity of the mounting member according to the first embodiment.
Figure 13B:
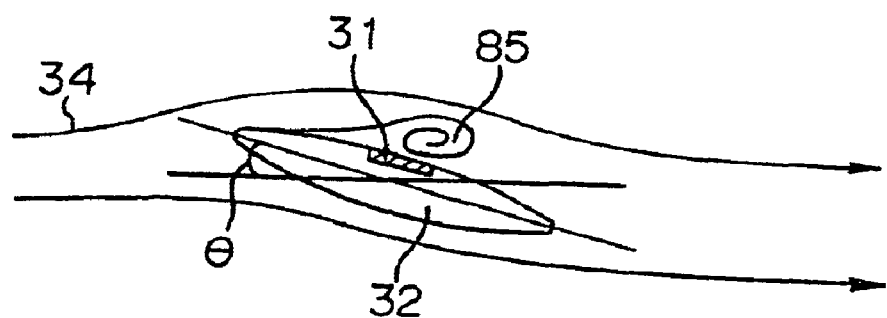
Figure 14:
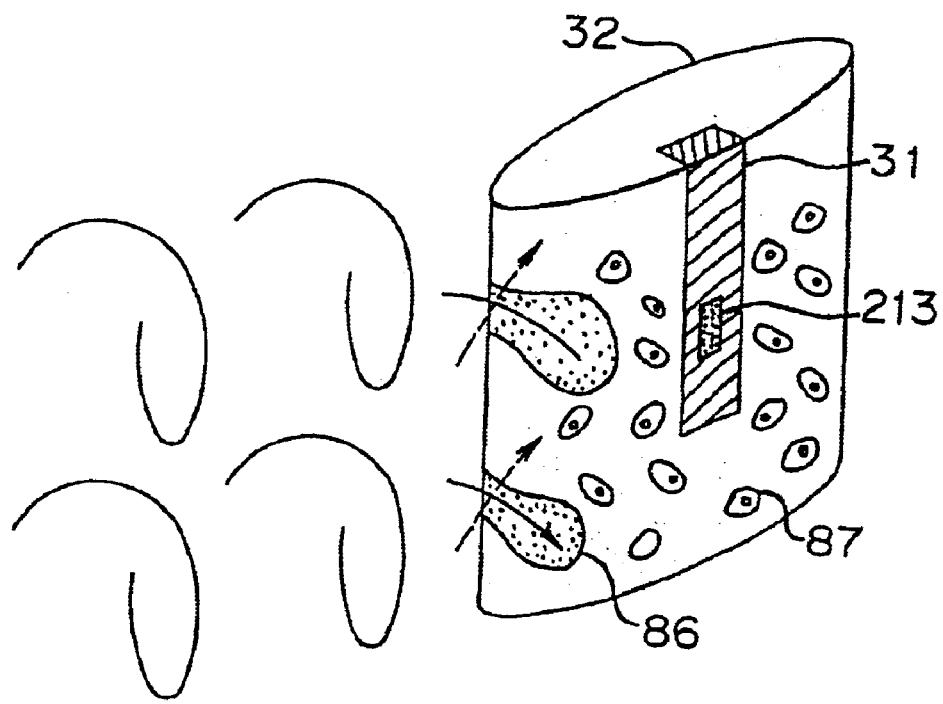
FIG. 14 is a schematic view to show how fluid streams are created when swirling streams collide with the mounting member according to the first embodiment.

Now, the separation at the tip of the mounting member 32 will be described. In FIGS. 13(a) and 13(b) are shown schematic cross-sectional views to explain how streams 34 flow in the vicinity of the mounting member 32 when the mounting member 32 formed in a two-dimensional shape is located along the streams (FIG. 13(a)), and when the mounting member 32 is located so as to be inclined at an angle θ with respect to the streams 34, respectively. In the case of FIG. 13(a), the streams 34 that have collided with the tip of the mounting member 32 move along the mounting member 32 smoothly and provide no separation in general. However, in the case of FIG. 13(b), the streams that have collided with the tip of the mounting member 32 can not move along the mounting member 32 completely, providing a separation region 85. In FIG. 14 is shown a schematic view to explain how streams flow when swirling vortexes collide with the mounting member 32. In FIG. 14, the streams collide with the mounting member 32 at an angle with respect to the mounting member 32, and the collided streams generate separation regions 86 at portions of the tip of the mounting member 32 where the mounting member is located so as to be inclined at a great angle with respect to the streams. Irregular vortexes 87 that are generated from the separation regions 86 move on and along the flow rate detecting element 31, making accurate flow rate detection by the flow rate detecting element 31 difficult.

Now, the separation suppression effect by the contracted measuring duct will be explained. When a flow is contracted and when the flow rate in the flow is constant toward the flow direction, the flow velocity generally increases as the duct becomes narrower. The following formula, which shows the Bernoulli's theory, holds between the velocity and the pressure of a flow:

$$0.5 \times \rho v^2 + P = \text{const.}$$

(ρ: density of fluid, v: flow velocity, P: pressure, const.: constant)

This formula shows that as a flow is gradually contracted from upstream toward downstream, the pressure decreases and the kinetic energy of the flow increases. In other words, the phenomenon of successive conversion into kinetic energy is produced in a contracted duct since streams become unstable at a velocity stagnating area, such as a separation region. This means that the provision of the mounting member in a contracted duct can reduce a separation region.

In order to overcome the problem in that the occurrence of separation degrades flow rate detection accuracy, the tip of the mounting member 32 is located at the restricted portion of the measuring duct 40 in this embodiment. Since there is a possibility that separation caused by a bump or separation as seen in Karman vortexes in tail streams is created at a tail of the mounting member except for the tip or a portion of the mounting member with the flow rate detected element carried thereon, it is preferable that the entire mounting member 32 is located at the restricted portion of the measuring duct 40.

Figure 15A:
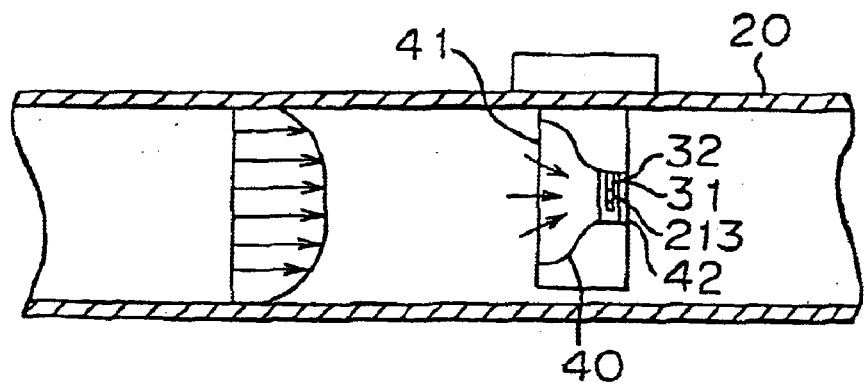
FIGS. 15(a) and 15(b) are a schematic view wherein a non-uniform flow distribution coming from upstream is not excessively deviated, and a schematic view wherein an air filter is clogged to significantly change the non-uniform flow distribution, in order to show a difference in velocity distributions at the same flow rate when the flow rate measuring device according to the first embodiment is located in an induction pipe.
Figure 15B:
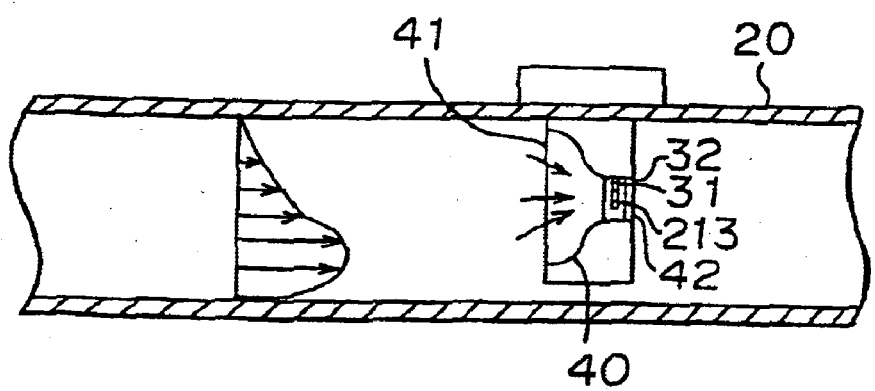

Next, the flow rate detection error caused by a non-uniform flow distribution will be explained. In FIGS. 15(a) and 15(b) are shown a schematic view to explain a case wherein a relatively weak non-uniform flow distribution comes from upstream (FIG. 15(a)), and a schematic view to explain a case wherein a strong non-uniform flow distribution caused by clogging of the air filter comes from upstream (FIG. 15(b)), in order to show the difference between different velocity distributions at the same flow rate when the flow rate measuring device 1 is located in the induction pipe 20. It is clear that the flow velocity at the central axis of the introduction pipe 20 in FIG. 15(a) is faster than that in FIG. 15 (b). This means that a great flow rate error is produced if only the flow velocity in the vicinity of the center is detected.

In this embodiment, the flow is contracted by the measuring duct 40 to be equalized. Since the detector of the detecting element 31, such as the flow rate detecting diaphragm 313, is located in the vicinity of the middle point in the longitudinal length of the fluid introduction port 41 of the measuring duct with the detector provided therein, most of the streams entering the fluid introduction port are collected on the detector 313. This arrangement can minimize a change in the flow velocity in the vicinity of the detector 313 to prevent the flow rate detection accuracy from degrading even if a change in the flow velocity distribution occurs upstream the flow rate measuring device.

As explained, the arrangement according to this embodiment can correct a non-uniform flow distribution to reduce an error in flow rate detection, being combined with the arrangement wherein the introduction passage is contracted by the flow rate measuring device per se.

Figure 16:
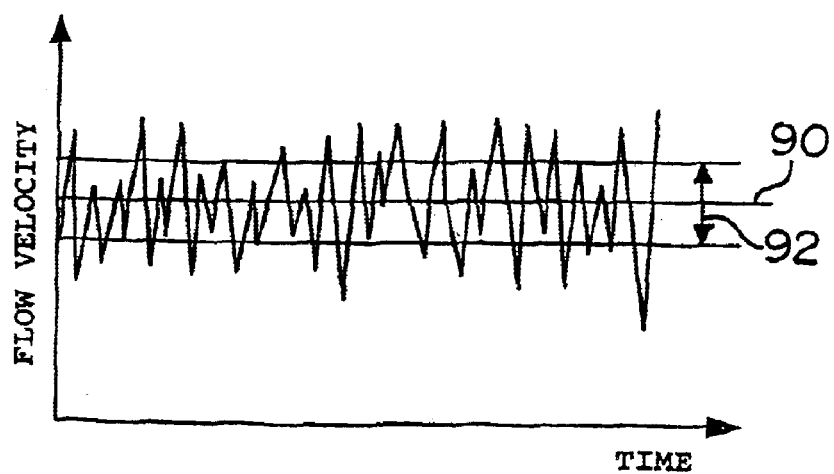
FIG. 16 is a graph to show changes in flow velocities with respect to respective times in the first embodiment.

Next, noise caused by a disturbing degree will be described. In FIG. 16 is shown changes in flow velocities to times. In general, a flow more and less varies with respect to times, and variations in the flow can be considered in such a way that the components of the flow are divided into an average flow velocity component and a variable flow velocity component. In this FIG., reference numeral 90 designates an average flow velocity, and reference numeral 92 designates a standard deviation of variable components. A flow with a high disturbing degree has a great variable component, which means that an error in momentary flow rate detection (called noise herein) is great. Since it is indispensable that a flow rate measuring device to be used for an internal combustion engine can detect momentary flow velocities moment by moment even when the flow accelerates rapidly, such as when an accel pedal is pressed down, it is clearly important to reduce a disturbing degree in order to detect momentary flow rates accurately.

According to this embodiment, the measuring duct 40 can be contracted to reduce a disturbing degree according to the disturbing degree damping ratio curve stated earlier, allowing flow rate measurement to be carried out with minimized noise.

As stated earlier, it is important that the mounting member 32 is provided so as to have the tip located at the restricted portion of the measuring duct 40 in order to prevent separation from occurring at the tip of the mounting member when swirling streams enter the measuring duct 40. This also applies to noise. The restraint of separation can restrain the occurrence of irregular vortexes, that is to say, restrain the occurrence of noise. Since the provision of the entire mounting member 32 at the restricted portion of the measuring duct 40 can restrain separation from occurring at the tail of the mounting member 32 and at the portion of the mounting member with the flow rate detecting element 31, the noise generating from the entire mounting member 32 can be reduced to provide accurate flow rate measurement.

Figure 17C:
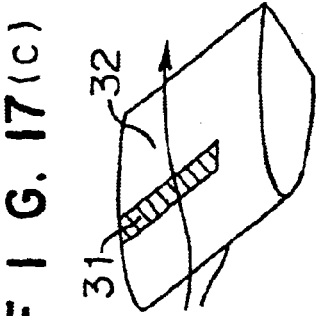
FIGS. 17(a)–17(i) are perspective views of different shapes of the mounting member according to the first embodiment.
Figure 17F:
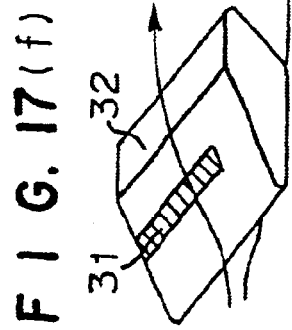
Figure 17I:
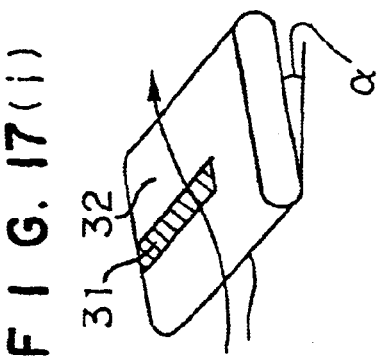
Figure 17B:
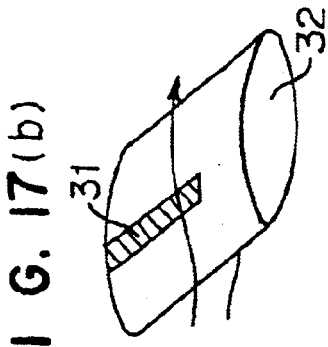
Figure 17E:
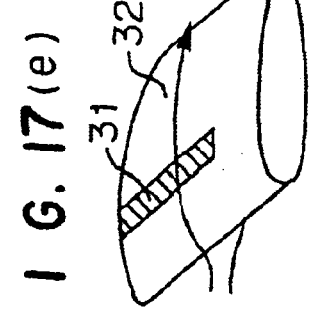
Figure 17H:
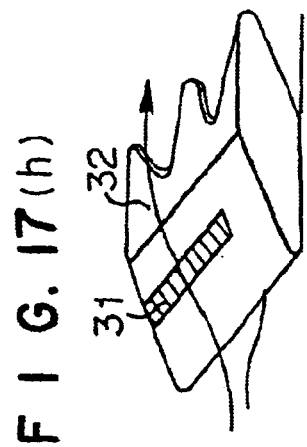
Figure 17A:
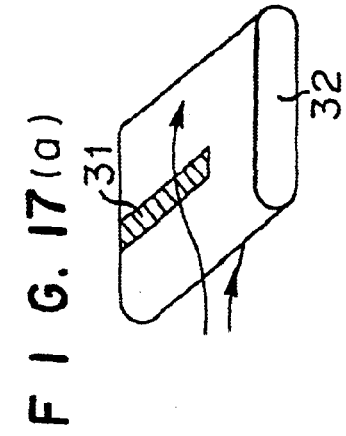
Figure 17D:
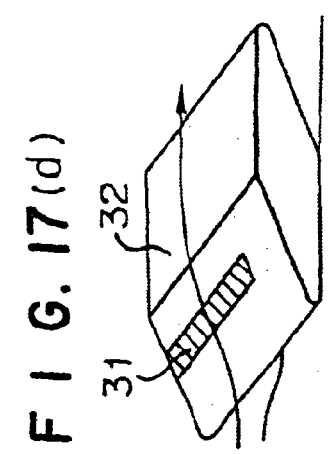
Figure 17G:
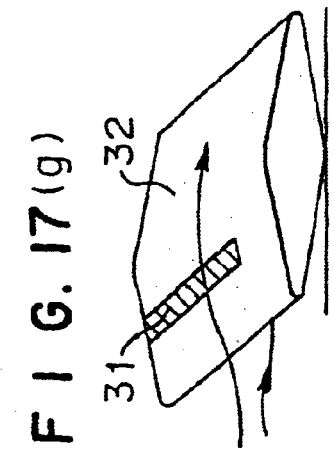

Next, the shape of the substantially plate-shaped mounting member 32 will be described. The substantially plate-shaped mounting member 32 may be formed so as to have various cross-sectional shapes, such as the shapes as shown in FIGS. 17(a)–17(i). In FIG. 17(a), the plate-shaped mounting member has a constant thickness. In FIG. 17(b), the mounting member is formed so as to have an elliptical cross-sectional shape, and includes a region wherein the wall thickness increases from the upstream end toward the downstream end. The detecting element 31 is located on the region with the wall thickness gradually increased. By this arrangement, the separation in streams along the surfaces of the mounting member 32 from the upstream end thereof can be restrained to further stabilize the streams passing on the surface of the flow rate detecting element 31, providing the flow rate measuring device with better measurement accuracy. In FIG. 17(*c*), the mounting member, which has an elliptical cross-sectional shape, has the tail slantwise cut. The tail as an edge of the surface with the flow rate detecting element 31 carried thereon extends the downstream direction. By this arrangement, since the vortexes that are generated on the downstream side when the flow has decelerated are guided to the surface without the flow rate detecting element 31 to be prevented from arriving at the flow rate detecting element 31 in addition to the suppression effect of the separation, flow rate detection can be carried out with better accuracy. In FIG. 17(*d*), the mounting member is formed in a parallelogrammatic cross-sectional shape. In FIG. 17(*e*), the mounting member is formed in a bladed cross-sectional shape. In FIG. 17(*f*), the mounting member is formed in a trapezoidal cross-sectional shape. In FIG. 17(*g*), the mounting member is formed in a rhomboid cross-sectional shape. The mounting members shown in FIGS. 17(*d*) and 17(*f*) can offer similar advantages to the mounting member shown in FIG. 17(*c*). The mounting members shown in FIGS. 17(*e*) and 17(*g*) can carry out stable flow measurement since the symmetry of the shape with respect to a flow provides symmetrical streams along the surface of the mounting member 32 with the flow rate detecting element 31 and the surface of the mounting member 32 without the flow rate detecting element 31. The mounting member shown in FIG. 17(*h*) is formed so as to have a parallelogrammatic cross-sectional shape and has a tail thereof provided with notches, and the mounting member can bring an advantage offered by the provision of the notches stated later on, in addition to the advantages offered by the mounting member shown in FIG. 17(*c*). In FIG. 17(*i*), the plate-shaped mounting member 32 shown in FIG. 17(*a*) is provided so as to be inclined at an angle α with respect to the flow, offering similar effects to the mounting member shown in FIG. 17(*c*).

The mounting members 32 shown in FIGS. 17(*a*)–17(*g*) and (i) may have a tail thereof provided with a notch or notches. The mounting members 32 shown in FIGS. 17(*a*)–17(*h*) may be provided so as to be inclined with respect to a flow.

When the mounting member 32 is provided so as to be inclined with respect to a flow, the streams on the surface of the mounting member with the flow rate detecting element 31 carried thereon is required to be free from the occurrence of separation, and the streams on the surface of the mounting member without the flow rate detecting element 31 may create separation. Although the angle α ranges from 0 degree to 90 degree, it is preferable that the mounting member is inclined at an angle between 0 degree and 45 degree in order that a principal stream flows on the surface of the flow rate detecting element 31 in stable fashion.

Every one of the mounting members 32 shown in FIGS. 17(*a*)–17(*i*) is regarded as being provided along the flow direction of streams, including the case of the inclined provision to streams.

Figure 18:
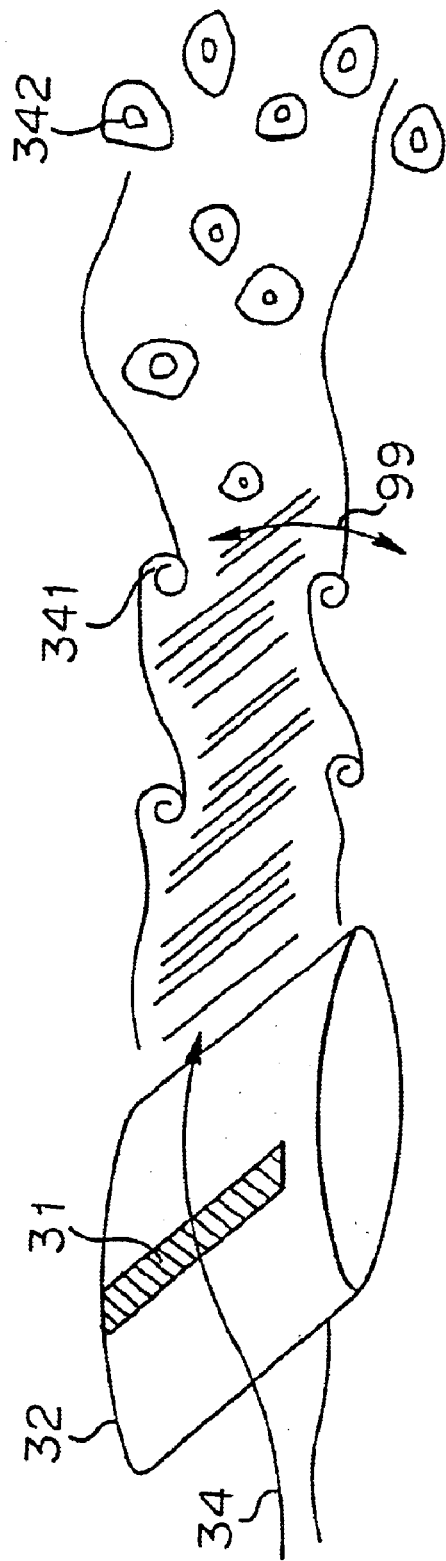
FIG. 18 is a schematic perspective view to show how fluid streams are produced when the mounting member according to the first embodiment does not have a tail thereof provided with a notch.
Figure 19:
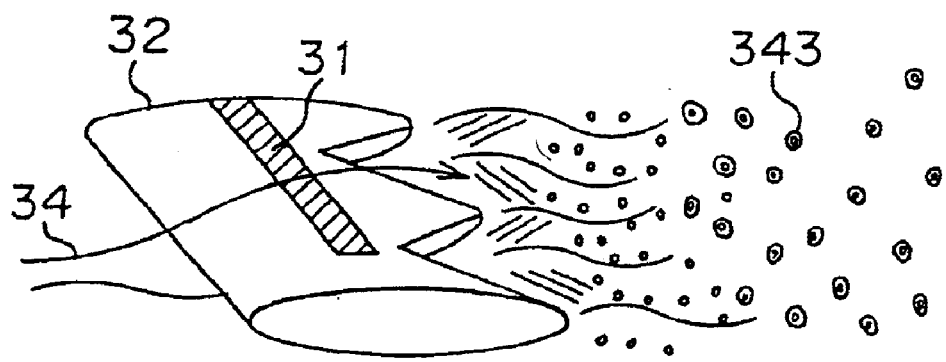
FIG. 19 is a schematic perspective view to show how fluid streams are created when the mounting member according to the first embodiment has the tail formed with notches.

In order to explain an advantage offered by the provision of a notch or notches, a case wherein no notches are provided and a case wherein notches are provided are compared in terms of flow fashion. In FIG. 18 is shown a schematic perspective view to explain how streams flow when a mounting member has a tail thereof provided with no notch or notches. In FIG. 19 is shown a schematic perspective view to explain how streams flow when a mounting member has a tail thereof provided with notches.

In the case of the absence of the notches shown in FIG. 18, massive and cyclic vortexes 341 generate from the tail of the mounting member, and the vortexes break and collapse into a plurality of discrete vortexes 342 afterward since the mounting member 32 has a two-dimensional shape. They are cyclic vortexes in accordance with Kelvin-Helmholtz instability referred to in typical articles about hydrodynamics, and Karman vortexes generated in rear streams from a two-dimensional column under a specific Reynolds number. In this case, fluid vibration generates in a direction perpendicular to the streams as indicated by an arrow 99 to affect the streams along the surfaces of the mounting member 32, vibrating the streams, which causes an error in flow rate detection.

When the mounting member 32 has a tail provided with notches as shown in FIG. 19, the streams along both surfaces of the mounting member 32 gradually join from the tail to separate cyclic vortexes caused by Kelvin-Helmholtz instability into small pieces, generating small discrete vortexes 343.

In other words, the provision of the notches at the tail of the mounting member 32 in a two-dimensional shape can gradually join the streams along both surfaces of the mounting member 32 with the detecting element 31 and without the detecting element 31 to generate such small discrete vortexes 343. As a result, the occurrence of the massive and cyclic vortexes 341 that generate in a case without the notches can be restrained to suppress the fluid vibration 99. Thus, the fluid vibration in the streams along the surfaces of the mounting member 32 can be suppressed to provide the detecting element 31 with stable flow rate measurement, realizing flow rate measurement with good accuracy.

As explained, the flow rate measuring device according to this embodiment comprises the post 33 to be provided in the induction pipe 20 as the fluid passage for passing a fluid flow so as to extend across a part of the fluid flow, the measuring duct 40 formed in the post 33, and the flow rate detecting element 31, wherein the measuring duct 40 has the fluid introduction port 41 formed in an elongated shape and confronted the flow direction of the flow, the measuring duct 40 is contracted so as to have the portion thereof between the fluid introduction port 41 and the flow rate detector (the mounting member 32) substantially smoothly narrowed toward the downstream direction of the flow in the longitudinal direction, wherein the portion of the measuring duct is a space formed as a single hole, or the portion is not separated by a partition or a similar member, and wherein the flow rate detector comprises the substantially plate-shaped mounting member 32 substantially located along the flow direction and in substantially parallel with the longitudinal direction of the fluid introduction port 41, and the flow rate detecting element 31 carried on the main surface of the mounting member 32. The swirling vortex is divided in to the plural swirling vortexes at the elongated introduction port 41. When the divided swirling vortexes are contracted in and pass through the single measuring duct 40, adjoining swirling vortexes have the rotary energy weakened by friction each other and the scale reduced while the rotation is strengthened. As a result, the rotary energy of the divided swirling streams can be weakened, the non-uniform flow distribution can be corrected by the contraction of the streams to reduce a disturbing degree. In addition, the swirling vortexes divided by the mounting member 32 can have the rotary energy further weakened to reduce the separation regions between the introduction port and the flow rate detector, allowing the flow rate measuring device to carry out flow rate measurement with good accuracy and minimized noise.

Although the measuring duct is shown to have the portion between the fluid introduction port 41 and the flow rate detector (the mounting member 32) gradually contracted in this embodiment, the measuring duct may include a parallel passage with little contraction as long as the measuring duct is substantially smoothly contracted. Even in this case, the measuring duct can offer similar advantages to this embodiment.

Although it is preferable that the portion of the measuring duct 40 between the fluid introduction port 41 and the flow rate detector (the mounting member 32) is a space as a single passage, that is to say, a space free from separation by a partition or a similar member, the measuring duct may be divided into a plurality of sections. When the measuring duct has at least a portion from a location upstream the mounting member 32 to the tip of the mounting member 32 formed as a single passage and contracted so as to be substantially smoothly narrowed toward the downstream direction, adjacent swirling vortexes have the rotary energy weakened by friction each other and the scale reduced during passage in the contracted fashion in such a region inside the measuring duct 40 while the rotation is strengthened. Thus, the rotary energy of the swirling streams can be weakened, and the non-uniform flow distribution can be corrected by the contraction of the streams to reduce a disturbing degree. The swirling vortexes divided by the mounting member 32 has the rotary energy further weakened. Even when the swirling streams collide with the tip of the mounting member 32, separation can be avoided. As a result, the flow rate measuring device can carry out flow rate measurement with good accuracy and minimized noise.

The measurement duct is required to be contracted from an upstream location apart from the mounting member 32 since the advantage stated earlier can not be offered when the measuring duct is contracted from a location close to the mounting member 32. Even if the measuring duct includes a parallel passage with little contraction in this case, the measuring duct can offer similar advantages as long as the measuring duct is substantially smoothly contracted.

Measuring duct 40 according to this embodiment can linearly extend in the introduction pipe 20 as the fluid passage in a direction from upstream toward downstream to sensitively detect a change in the flow.

The extension in the flow direction means that the fluid exit port 42 of the measuring duct 40 is visible from the fluid introduction port 41 of the measuring duct. Even a case wherein the measuring duct includes a slightly curved passage up to the exit port 42 can be covered by the present invention as long as the flow can be directly introduced and a change in the flow can be sensibly measured as in this embodiment.

Since the detector of the detecting element 31, such as the flow rate detecting diaphragm 313, is located in the vicinity of the middle point in the longitudinal length of the fluid introduction port 41 of the measuring duct with the mounting member 32 provided therein, most of the streams entering the fluid introduction port 41 are collected on the detector. This arrangement can minimize a change in the flow velocity in the vicinity of the detector to make a degradation in flow rate detection accuracy difficult even if a change in the flow velocity distribution occurs upstream the flow rate measuring device.

Since the flow in the introduction pipe 20 has a distribution more greatly deviated in the longitudinal direction of the fluid introduction port 41 than the transverse direction of the fluid introduction port as shown in FIGS. 15(*a*) and 15(*b*), the provision of the diaphragm 313 at the center in the longitudinal direction is superior to the provision of the diaphragm at the center in the transverse direction.

It is important that the diaphragm 313 as the flow rate detector is located in the vicinity of the center in the longitudinal direction in the portion of the measuring duct 40 restricted in the longitudinal direction. When the mounting member 32 has the longitudinal direction thereof located perpendicularly to the longitudinal direction of the fluid introduction port 41 as shown in FIG. 12(*b*), the diaphragm 313 as the flow rate detector is located in the vicinity of the center in the transverse direction of the restricted portion, which offers less advantages than the case of FIG. 12(*a*) though the streams are collected from the longitudinal direction of the fluid introduction port 41.

In accordance with this embodiment, the measuring duct 40 is provided so that the introduction port 41 has the longitudinal direction or long sides extended in a diametrical direction of the cylindrical induction pipe 20 and that the center of an imaginary plane of the measuring duct 40 perpendicular to the flow direction of the fluid substantially conforms to the center of an imaginary plane of the cylindrical induction pipe 20 perpendicular to the flow direction of the fluid. By this arrangement, streams in the vicinity of the center of the induction passage with a small change in the velocity distribution can be introduced into the measuring duct to provide the flow rate measuring device with flow rate measurement in good accuracy.

When the induction pipe 20 is formed in other cross-sectional shapes than a circular cross-sectional shape, such as an elliptical cross-sectional shape and a square cross-sectional shape, it is sufficient that the introduction port 41 is located in a substantially central portion of an imaginary plane of the induction pipe 20 perpendicular to the flow direction of the fluid, which offers similar effects to the first embodiment.

In accordance with this embodiment, the introduction port 41 has a curved shape to smoothly introduce streams from the introduction port 41 into the measuring duct 40, providing the flow rate measuring device with flow rate measurement in good accuracy.

In accordance with this embodiment, the inner wall surface of the measuring duct 40, which is gradually narrowered toward the downstream direction, is formed so that at least a portion of the intersection 84 between the imaginary plane 83 perpendicular to the fluid introduction port 41 and in parallel with the longitudinal direction of the fluid introduction port, and the inner wall surface is a substantially smooth curved line, as shown in FIGS. 7 and 8. The smooth curved line is a substantially continuous curved line including the point of inflection 50. The curved line is a cubic function line or a line substantially approximate to a cubic function line. Thus, the steams that pass through the measuring duct 40 can be smoothly contracted to provide the flow rate measuring device with flow rate measurement in good accuracy. In addition, since the point of inflection 50 is located at a position that is apart from the introduction port of the measuring duct toward the downstream direction by a distance of substantially 0.3 L where the longitudinal length of the introduction port is defined as L, the flow passing through the measuring duct 40 can be further smoothly contracted.

The measuring duct may be formed in a simple shape, such as a tapered shape and a shape including a line approximate to a quadratic curve, offering similar advantages. In this case, cost reduction can be further provided since the shape of a mold for forming the device from plastic material can be simplified. However, the intersections 84 formed in a cubic curve offers desirable characteristics to correction in a non-uniform flow distribution and a reduction in a disturbing degree.

Since the measuring duct 40 is formed in the post 33, the flow rate measuring device 1 can be simply plugged in for measurement without interference with other members as long as the seat 23 for mounting the flow rate measuring device 1 is preliminarily formed in a portion of the air cleaner 2 or the induction pipe 20. The flow rate measuring device can increase degrees of freedom in terms of mounting the device to an engine. It is easy to repair or inspect the flow rate measuring device 1. The flow rate measuring device can simplify an automobile assemble line to reduce cost by increased productivity. Since the flow rate measuring device can be provided so as to have resistance to a non-uniform flow distribution equal to that in the provision of a rectifying member, such as a honeycomb arrangement and a rectifying grid, the reduction in the cost required for parts and a decreased pressure loss can be realized.

Figure 40:
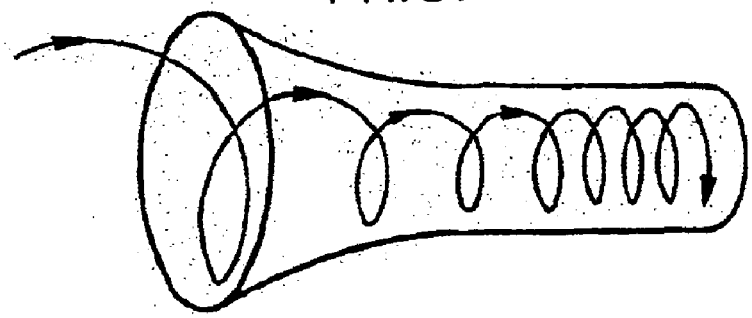
FIG. 40 is a schematic view to explain the movement of a swirling stream in the first prior art.
Figure 41:
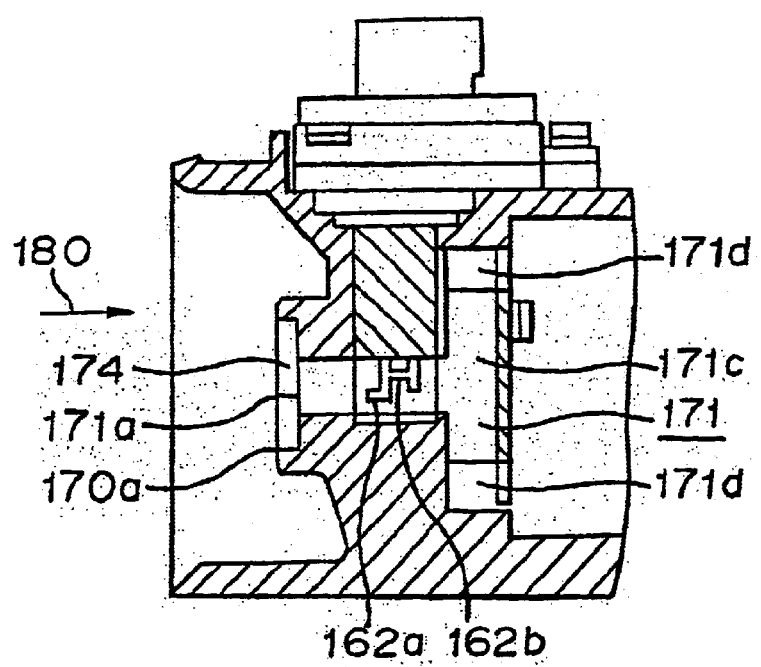
FIG. 41 is a vertical cross-sectional view of a flow rate measuring device according to a second prior art.
Figure 42:
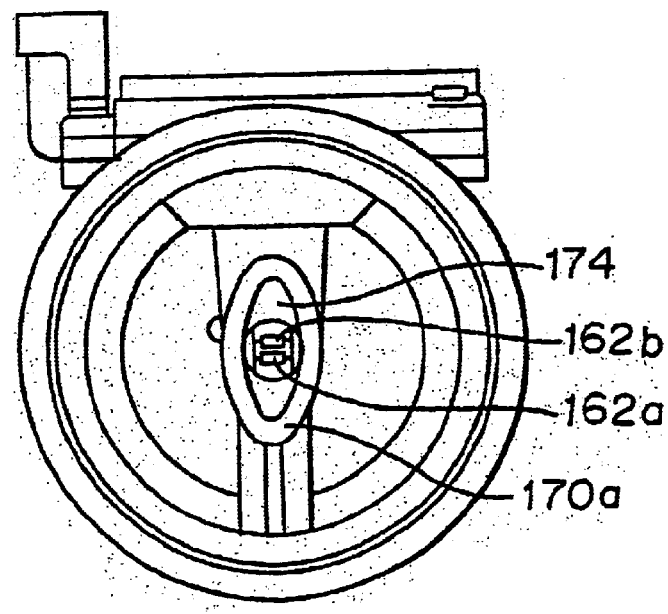
FIG. 42 is a plan view of the device of FIG. 41 as viewed from an upstream side thereof.
Figure 43:
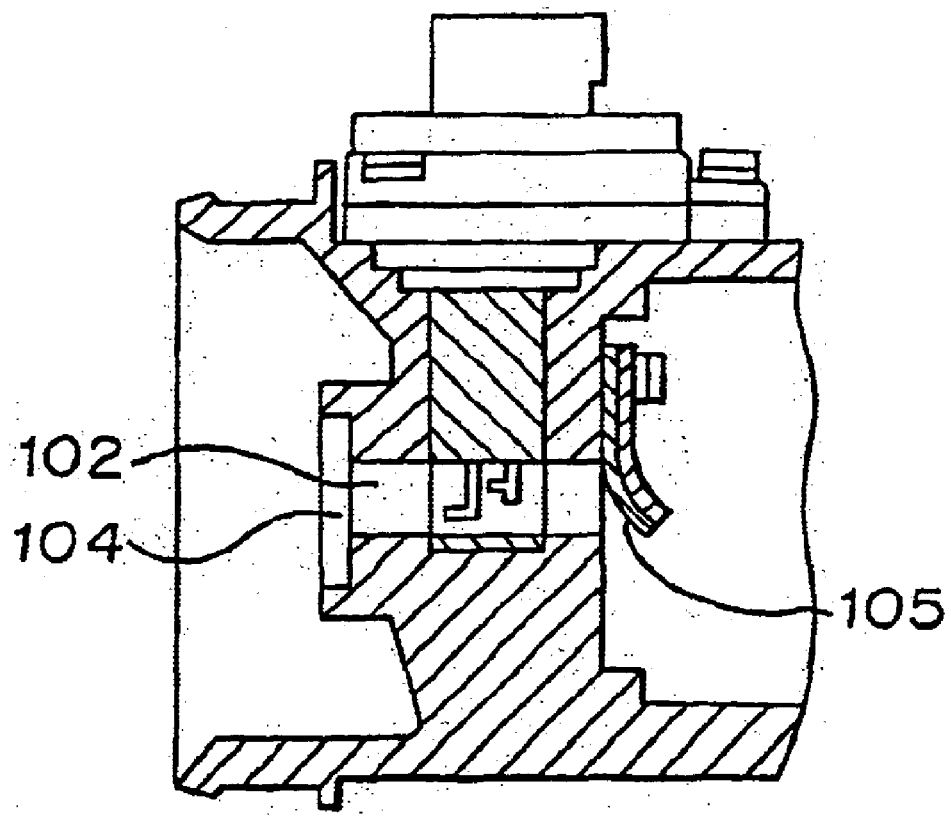
FIG. 43 is a vertical cross-sectional view of another flow rate measuring device according to the second prior art.
Figure 44:
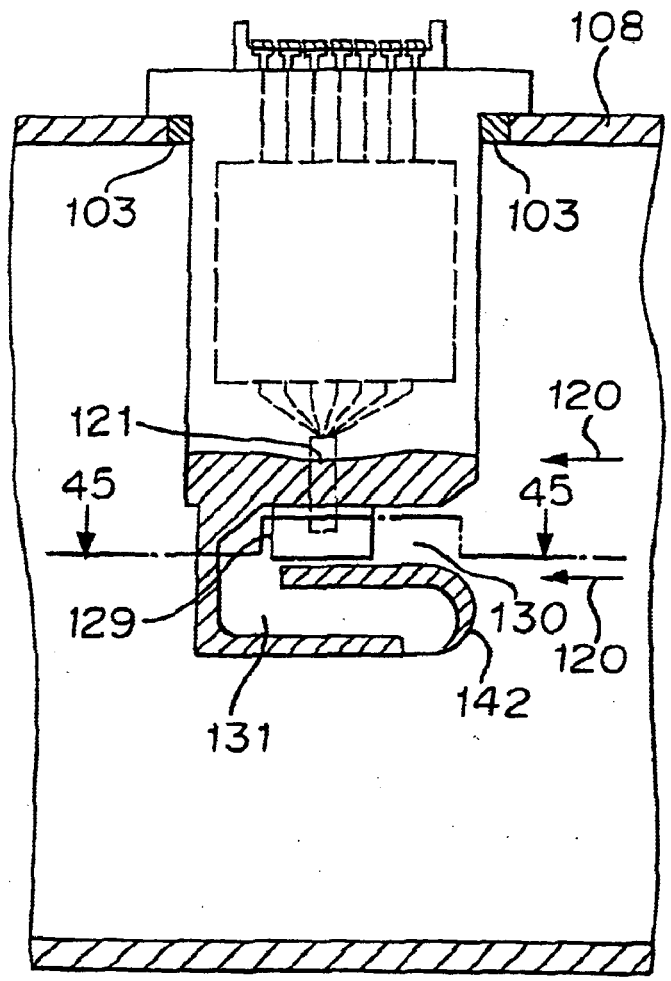
FIG. 44 is a vertical cross-sectional view of the flow rate measuring device according to third prior art.
Figure 45:
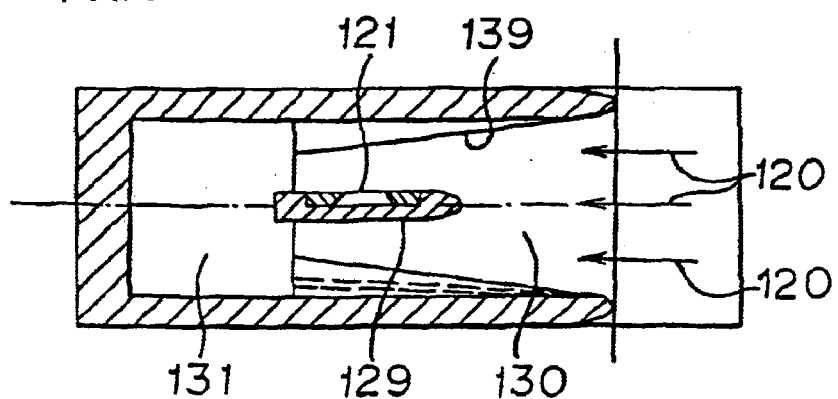
FIG. 45 is a cross-sectional view taken along the line 45—45 of FIG. 44.

When a case wherein the introduction port 41 of the measuring duct is formed in a rectangular shape as in this embodiment is compared to a case wherein the introduction port is formed in such a square form to have the substantially same projected cross-sectional area as viewed from the upstream side of the flow rate measuring device 1 and to have the same pressure loss, the latter case can not separate a swirling stream into a plurality of swirling streams unlike the example shown in FIG. 10 since the introduction port 41 has a cross-sectional shape close to a circle. The latter case can not weaken the rotation of the vortex. In the latter case, the rotation of the vortex is strengthened since the vortex is contracted with the rotary radius becoming smaller as shown in FIG. 40. As a result, the flow velocity distribution in the measuring duct 40 is deviated outward, a great error in flow rate detection can be clearly produced at the flow rate detecting element 31, which is located in the vicinity of the center of the measuring duct. This means that the provision of the introduction port 41 in a rectangular shape according to this embodiment is effective in reducing an error in flow rate detection when the flow rate measuring device maintains the same pressure loss. In other words, the pressure loss can be reduced when the flow rate measuring device 1 maintains the flow rate detection error at the same level.

Since the flow rate measuring device according to this embodiment can reduce the pressure loss, the flow rate measuring device can take a greater amount of air into an internal combustion engine to improve the output of the internal combustion engine by being used as an intake air flow meter, for instance.

Even if the flow is reversed in the induction pipe 20 by blow-back of an engine, the flow going back from the exit port 42 of the measuring duct 40 can collide directly with the flow rate detecting element 31 carried on the mounting member 32 to enable sensitive detection of a backward stream component since the measuring duct 40 extends in the flow direction. In this case, the flow rate detecting element 31 is required to enable detection of a backward stream.

Although the explanation of this embodiment has been made with respect to a case wherein the flow rate measuring duct is of a plug-in type, the flow rate measuring device according to this embodiment is not limited to such a plug-in type. When the flow rate measuring duct is not of a plug-in type, the streams 35 that overflow after having entered the measuring duct 40 can be reduced by providing the measuring duct 40 with a sufficient length in the flow direction so as to gently contract the flow from upstream. Thus, the flow can be clearly introduced into the measuring duct 40 in a greater amount to carry out flow rate measurement with better accuracy.

Although the explanation of the first embodiment has been made with respect to the case wherein the post 33 is dug in a certain shape to provide the measuring duct 40, the present invention is not limited to such a mode. For example, the post may be formed by sandwiching an independently prepared measuring duct 40 between thin plates, or may be formed by preparing the measuring duct 40 as independent parts divided in the longitudinal direction and combining the divided parts. The measuring duct may be formed by another method. This also applies to each of the subsequent embodiments.

Embodiment 2

Figure 20:
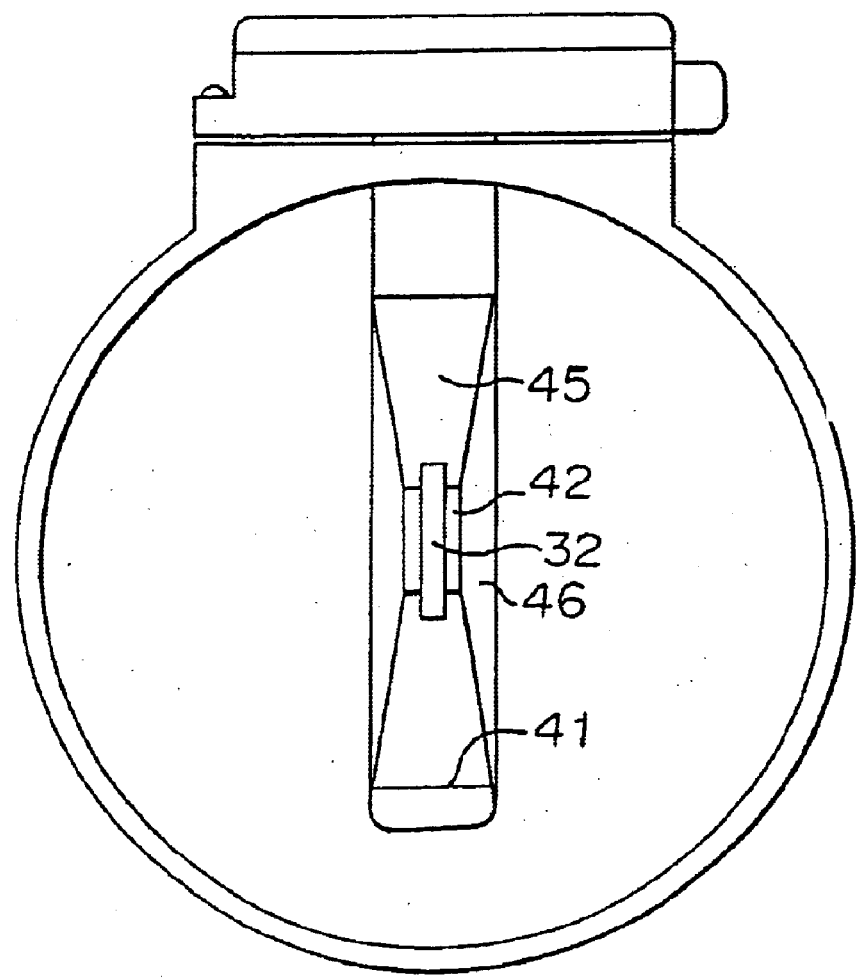
FIG. 20 is a front view of the flow rate measuring device according to a second embodiment of the present invention.

In FIG. 20 is shown a front view of the flow rate measuring device according to a second embodiment of the present invention. In this FIG., reference numeral 46 designates one of opposite tapered walls. In this embodiment, the measuring duct 40 has the length in the transverse direction of the elongated introduction port or short sides gradually shortened toward the downstream direction between the introduction port 41 and the exit port 42 as in the length of the introduction port in the longitudinal direction. In other words, the transverse cross-sectional shape of the measuring duct 40 perpendicular to the flow is gradually shortened toward the downstream direction in terms of the length in the transverse direction as well in comparison with the mode of the first embodiment shown in FIG. 6(b).

Figure 21:
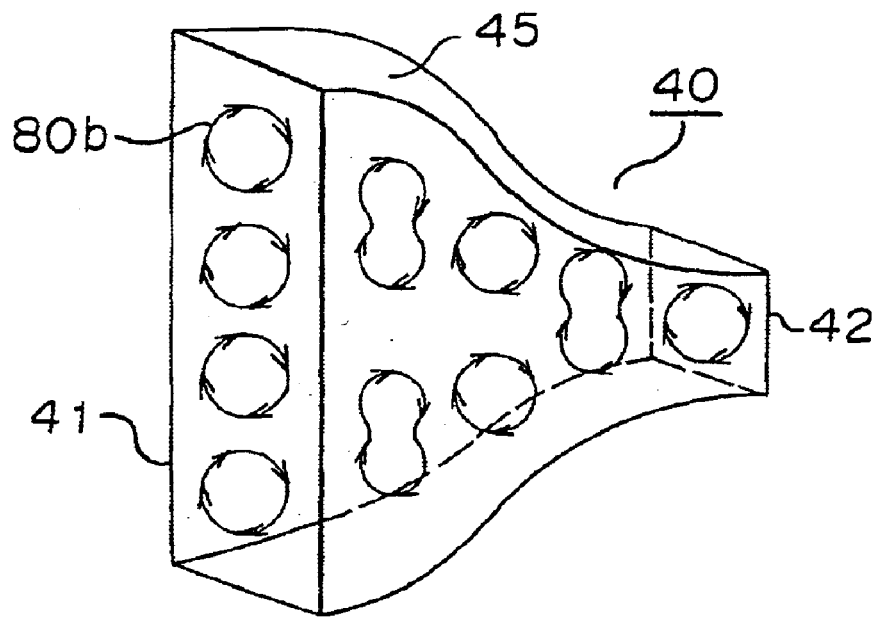
FIG. 21 is a schematic view to show how vortexes are created by swirling streams in the measuring duct according to the first embodiment.
Figure 22:
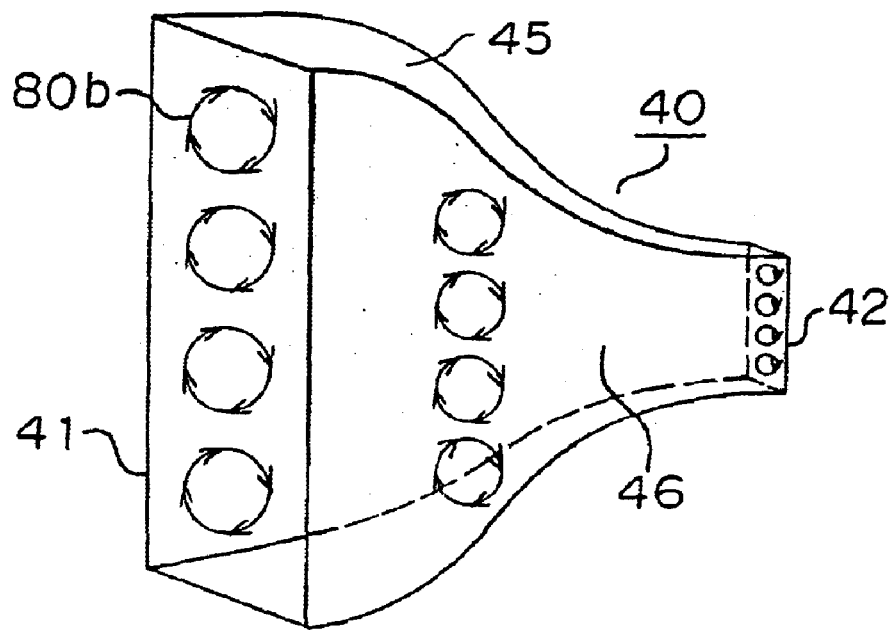
FIG. 22 is a schematic view to show how vortexes are created by swirling streams in the measuring duct according to the second embodiment.

Now, the operation will be explained. The explanation will be made, comparing this embodiment with the first embodiment for easy comprehension of the operation. In FIG. 21 is shown a schematic view to explain how vortexes are created by swirls in the measuring duct according to the first embodiment. In FIG. 22 is shown a schematic view to explain how vortexes are created by swirls in the measuring duct according to the second embodiment. In order to clarify the difference provided by a gradual reduction in the transverse direction as well, the explanation will be made with respect to examples shown in FIGS. 21 and 22. In FIG. 21, the number of the vortexes 80b that have been broken into four pieces at the introduction port 41 is gradually reduced by combination of the vortexes during contraction since the length in the longitudinal direction and the length in the transverse direction of the measuring duct 40 become equal as the measuring duct 40 becomes close to the exit port 42. In FIG. 21, it is shown that the vortexes are combined in two vortexes in the vicinity of the center in the flow direction of the measuring duct 40 and that the two vortexes are further combined into a single piece in the vicinity of the exit port 42. As stated earlier with respect to the first embodiment, it is essential that a vortex is divided into a plurality of pieces and adjoining vortexes cancel the velocities thereof each other in order to weaken the rotation of the vortexes caused by a swirling stream.

In the second embodiment shown in FIG. 22, the measuring duct 40 is contracted so as to have the length in the transverse direction as well as the length in the longitudinal direction gradually shorten. By this arrangement, the length in the transverse direction is prevented from becoming equal to the length in the longitudinal direction as the measuring duct 40 approaches the exit port 42. As a result, the plural vortexes 80*b* that have generated at the introduction port 41 are constantly adjacent without merging, the rotary velocity of the vortexes is constantly damping with the streams being contracted, and the streams that have introduced into the measuring duct flow on the flow rate detecting element 31.

A similar function can be expected even in the first embodiment since the provision of the flow rate detector or the mounting member per se in the measuring duct 40 substantially contributes to contraction of the measuring duct 40 in the transverse direction. In accordance with this embodiment, the measuring duct 40 can be further contracted in comparison with the first embodiment to further reduce the disturbing degree in the introduced streams, causing the non-uniform flow distribution to flow on the flow rate detecting element 31 in further corrected fashion.

Since the flow rate measuring device according to this embodiment is constructed as stated earlier, the aspect ratio of transverse cross-section areas of the measuring duct 40 on the downstream side is prevented from becoming equal. As a result, the vortexes caused by the swirling streams can be damped more easily, the presence of a high contraction ratio can not only correct the non-uniform flow distribution in better fashion but also further reduce the disturbing degree, carrying out flow rate measurement with better accuracy and lesser noise.

Although the measuring duct is contracted so as to have the length in the transverse direction gradually shortened toward the downstream side between the introduction port 41 and the exit port 42 in this embodiment, it is sufficient that the measuring duct is contracted so as to have at least a portion thereof between a location upstream the mounting member 32 and the tip of the mounting member 32 substantially smoothly narrowered toward the downstream side. Advantages similar to this embodiment can be offered even in such a case.

Although both end portions of the inner wall surface of the measuring duct in the transverse direction are formed by the tapered walls to contract the length of the measuring duct 40 in the transverse direction in this embodiment, the measuring duct according to this embodiment is not limited to such an arrangement. Both end portions of the inner wall surface may be curved surfaces according to a quadratic function or a cubic function as in the end portions of the inner wall surface of the measuring duct in the longitudinal direction explained with respect to the first embodiment. The point is that the measuring duct is contracted so as to be substantially narrowered toward the downstream side, offering similar advantages.

As long as the measuring duct is substantially smoothly contracted, the measuring duct may have a parallel passage with little contraction. Even in this case, similar advantages can be offered.

Embodiment 3

Figure 23:
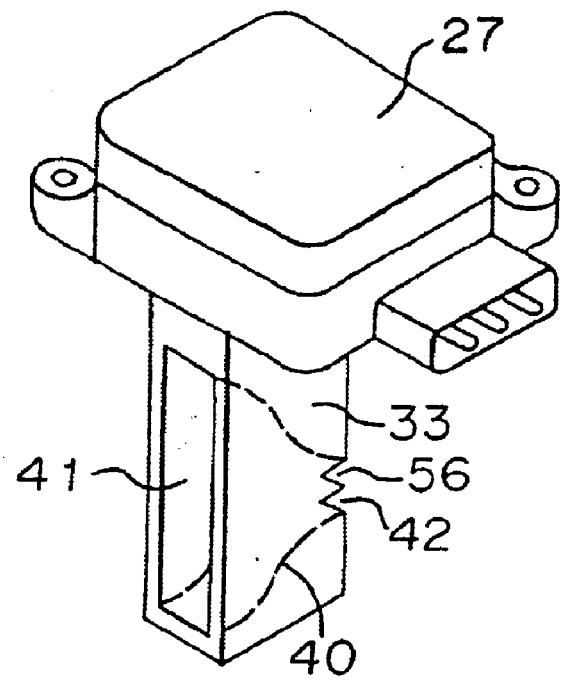
FIG. 23 is a perspective view of the flow rate measuring device according to a third embodiment of the present invention.

A third embodiment provides an arrangement to stabilize streams in the measuring duct and further reduce an error in flow rate detection in a constant flow and a pulsating flow. In FIG. 23 is shown a perspective view of the flow rate measuring device according to the third embodiment. In this FIG., reference numeral 56 designates notches, which are formed in side walls of the post 33 at the downstream end of the measuring duct.

Figure 24:
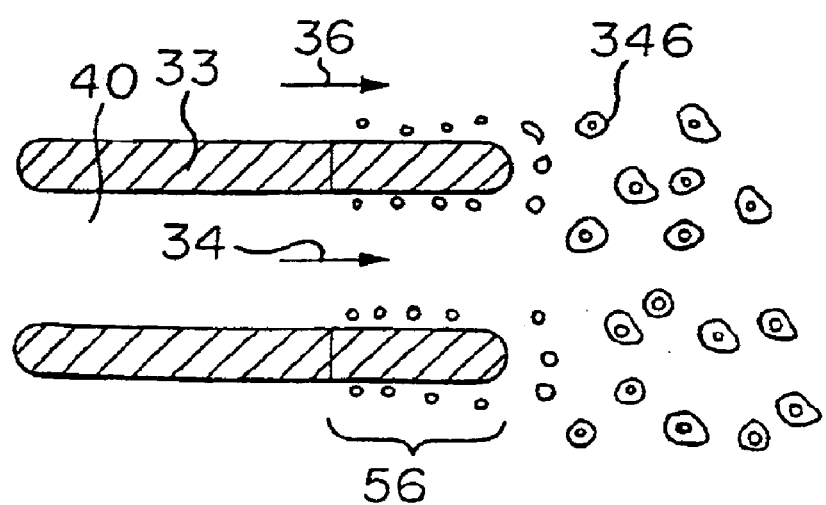
FIG. 24 is a schematic view to show how fluid streams are created when notches are provided in accordance with the third embodiment.
Figure 25:
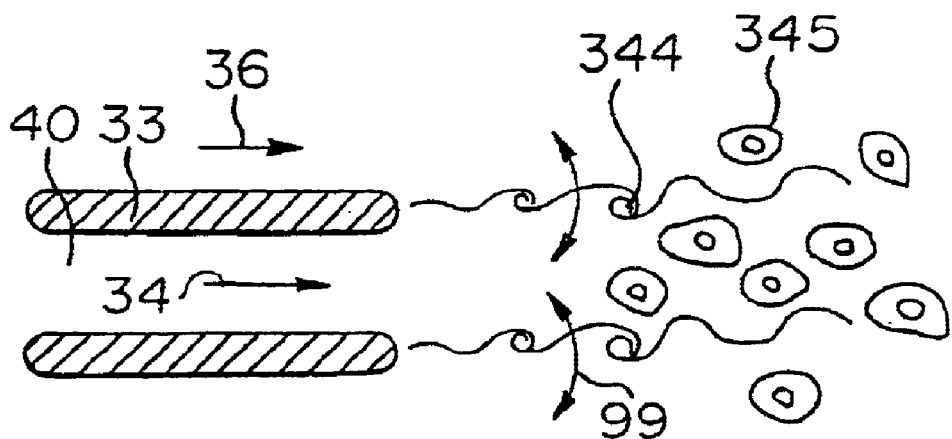
FIG. 25 is a schematic view to show how fluid streams are created when no notches is provided unlike the third embodiment.

Now, this embodiment will be explained in comparison with the absence of the notches.56 for easy comprehension of the operation in the provision of the notches 56. In FIG. 24 is shown a schematic view to explain how streams flow in the provision of the notches. In FIG. 25 is shown a schematic view to explain how streams flow in the absence of the notches. In both FIGS., the post is shown to be cut in the transverse direction along the flow direction.

When the notches 56 are not provided, that is to say, when streams 34 and 36 join at the tails of two flat plates, massive and cyclic vortexes 344 generate in accordance with Kelvin-Helmholtz instability stated in typical articles on hydrodynamics as shown in FIG. 25, the vortexes collapse into a plurality of discrete vortexes 345 while disturbing the advance of the stream 34.

On the other hand, when the notches 56 are provided as shown in FIG. 24, the range wherein the streams 34 and 36 join can be gradually widened to generate vortexes 346 in complicated, separated and discrete fashion. Thus, the disturbance to the advance of the stream 34 can be suppressed to restrain the velocity of the stream 34 from lowering. The stream can be introduced into the measuring duct in a greater amount to carry out flow rate detection with better accuracy.

When the notches 56 are not provided, the cyclic vortexes 344 vibrate in directions indicated by an arrow 99 to produce fluid vibration in the streams in the measuring duct. On the other hand, when the notches are provided, the vortexes can be separated to prevent the cyclic vortexes from generating. Thus, the fluid vibration in the measuring duct can be suppressed.

In the flow rate measuring device thus constructed in accordance with this embodiment, the stream 34 that has passed through the measuring duct 40 and the stream 36 that has passed outside the measuring duct 40 gradually join, and the cyclic vortexes are separated. The cyclic vortexes 344, which generate in the vicinity of the outlet of the measuring duct 40 behind the post 33 in the absence of the notches 56, can be prevented to restrain fluid vibration in the measuring duct 40. Thus, the steam 34 in the measuring duct 40 can be stabilized to reduce an error in flow rate detection. Although the discrete vortexes 345 generate at a downstream end in the measuring duct 40 in a constant flow and a pulsating flow, the disturbance of the vortexes 345 at the outlet of the measuring duct 40 can be reduced to introduce the stream from the introduction port 41 into the measuring duct 40 in a greater amount, allowing flow rate measurement to be carried out with better accuracy. The shape and the location of the notches 56 are not limited to the example shown in FIG. 23.

Embodiment 4

Figure 26:
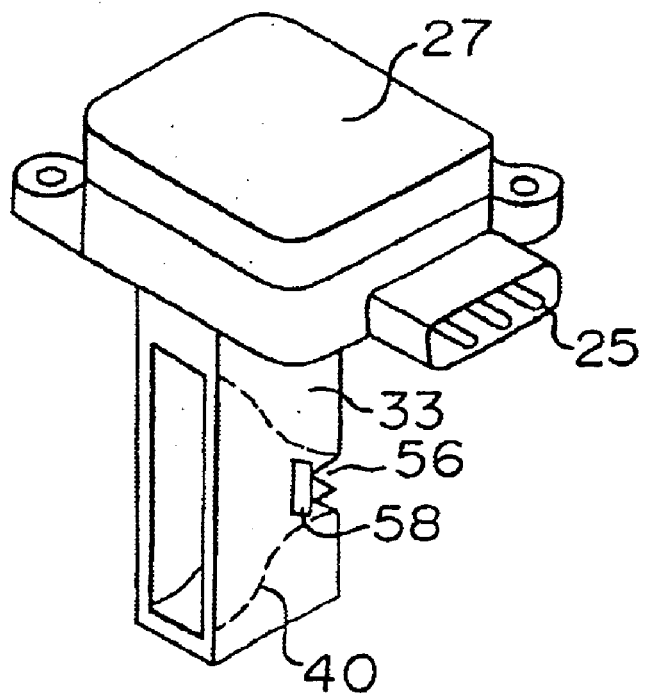
FIG. 26 is a perspective view of the flow rate measuring device according to a fourth embodiment of the present invention.

A fourth embodiment provides an arrangement to enhance the advantages offered by the notches 56. In FIG. 26 is shown a perspective view of the flow rate measuring device according to the fourth embodiment. In this FIG., reference numeral 58 designates one of convexities, which are provided on outer walls of the measuring duct upstream and in the vicinity of the notches 56. In FIG. 27 is shown a schematic view to explain how streams flow, wherein the post is shown to be cut at the location of the convexities in the transverse direction and along the flow direction.

Although the cyclic vortexes generate by the joint of the streams in the vicinity of the exit port of the measuring duct 40 in a constant flow and a pulsating flow, the provision of the notches 56 at the downstream end of the measuring duct 40 can separate the cyclic vortexes into smaller vortexes as stated earlier. It has been known that, in particularly a pulsating flow, the cyclic vortexes generate in more massive fashion at the join of the streams to prevent the stream 34 from the measuring duct 40 from smoothly moving in the vicinity of the exit port 42 of the measuring duct in comparison with a constant flow since the flow velocity varies timewise. Although the arrangement wherein the notches 56 are provided to separate the vortexes as stated earlier is effective to some extent, the vortexes are forcibly sucked out of the measuring duct 40 through the notches 56 to significantly reduce the adverse effect from the vortexes in accordance with this embodiment.

When the convexities are provided on the outer walls upstream and in the vicinity of the notches 56, some of the streams 36 that have passes outside the measuring duct 40 collide with the convexities 58, and the streams that have collided with the convexities fail to follow such steep bumps to produce negative pressure regions 60 downstream the convexities 78. Since the negative pressure regions 60 have a lower pressure than the inside of the measuring duct 40, the vortexes that have generated in the measuring duct 40 are forcibly sucked out of the measuring duct 40 through the notches 56.

The synergistic effect offered by the negative pressure regions 60 and the notches 56 can not only separate the relevant vortexes but also suck the relevant vortexes out of the measuring duct 40 to remove most of the vortexes as an obstacle to the advance of the stream 34 at the exit port 42. Thus, the air-flow resistance in the measuring duct 40 can be reduced to collect the fluid from upstream the measuring duct 40 in a wider range.

In the flow rate measuring device thus constructed in accordance with the fourth embodiment, the vortexes that generate when the stream 34 from inside the measuring duct and the streams 36 from outside the measuring duct 40 merge are separated, and the separated vortexes are sucked out of the measuring duct 40 through the notches 56. Thus, the vortexes as an obstacle to the streams at the exit port 42 can be removed to introduce the flow into the measuring duct 40 in a greater amount, allowing flow rate measurement to be carried out with better accuracy and minimized noise.

The shape of the convexities 58 is not limited to a triangular pyramid as shown in FIG. 26. The convexities may be formed in any shape as long as the convexities can produce the negative pressure regions 60 at the downstream end of the measuring duct. Even if the convexities are formed in a flat plate, a quadrangular prism or protections, such as circular cones and triangular pyramids, similar effects can be offered.

Embodiment 5

In FIG. 28 is shown a cross-sectional view of the post cut in the transverse direction and along the flow direction to explain how streams flow in an essential portion of the flow rate measuring device according to a fifth embodiment of the present invention. In this embodiment, at least a portion of the outer wall surface of each of side walls forming the measuring duct 40, that is to say, at least a portion of the outer wall surface of each of the side walls of the post 33 in FIG. 28 are streamlined. In other words, the post 33 has the wall thickness in the transverse direction gradually increased at the side wall surfaces from the introduction port toward the downstream direction and then gradually decreased toward the exit port.

Figure 29:
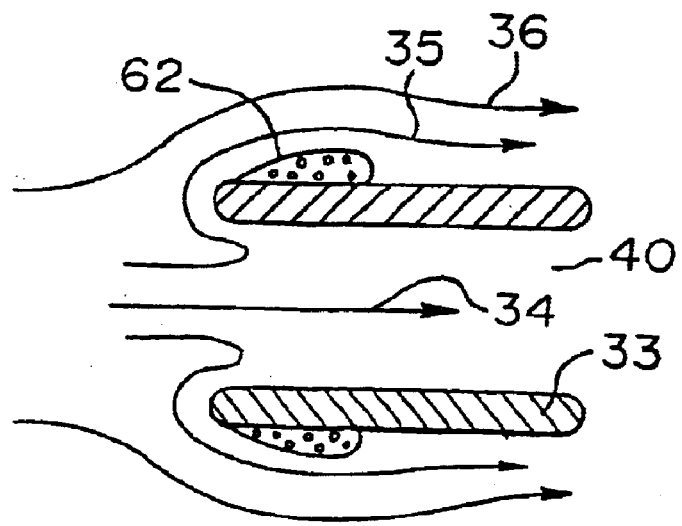
FIG. 29 is a schematic view to show how fluid streams are created when the outer walls of the post have a constant wall thickness in the width direction thereof in the fifth embodiment.

In FIG. 29 is shown a schematic view to explain how the streams flow when the post 33 has the wall thickness in the transverse direction at the outer wall surfaces made constant for easy comprehension of the features in the fifth embodiment. In this FIG., the post 33 is shown to be cut in the transverse direction along the flow direction.

Now, the operation in each of the examples shown in FIGS. 28 and 29 will be explained. There are the streams 35 which overflows outside after having entering the measuring duct 40 as stated earlier with respect to the first embodiment. The streams 35 are required to sharply bend until they join with the streams 36 passing outside the measuring duct 40 without entering the measuring duct. When the streams 35 are required to bend in such fashion, the streams fail to bend as expected to generate separation regions 62 in the arrangement shown in FIG. 29. On the other hand, in the arrangement according to the fifth embodiment, the streams along the outer wall surfaces of the measuring duct 40 hardly generate the separation regions 62 because of smooth flow since the post 33 has the wall thickness in the transverse direction at the outer wall surfaces on the upstream side gradually increased from the exit port toward the downstream side as shown in FIG. 28. In addition, the post 33 can have the wall thickness in the transverse direction at the outer wall surfaces on the downstream side gradually decreased toward the exit port to prevent the streams on the outer wall surfaces from separating, lowering pressure loss.

In the flow rate measuring device thus constructed in accordance with the fifth embodiment, the streams along the outer wall surfaces of the measuring duct 40 can be made smooth to restrain the separation, lowering pressure loss.

Since the flow rate measuring device according to this embodiment can reduce the pressure loss, the flow rate measuring device can take a greater amount of air into an internal combustion engine to improve the output of the internal combustion engine by being used as an intake air flow meter for instance.

Figure 30A:
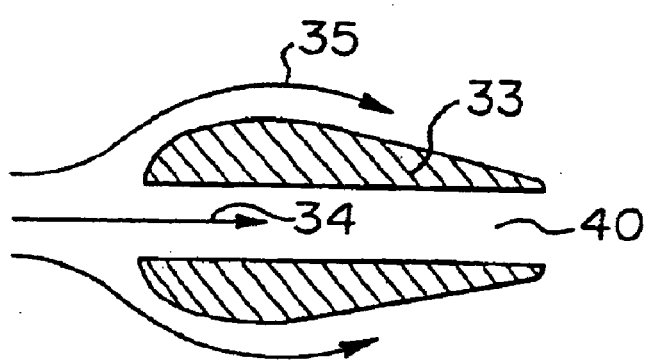
FIGS. 30(a) and 30(b) are vertical cross-sectional views to show modified examples of the outer wall profile of the post according to the fifth embodiment.
Figure 30B:
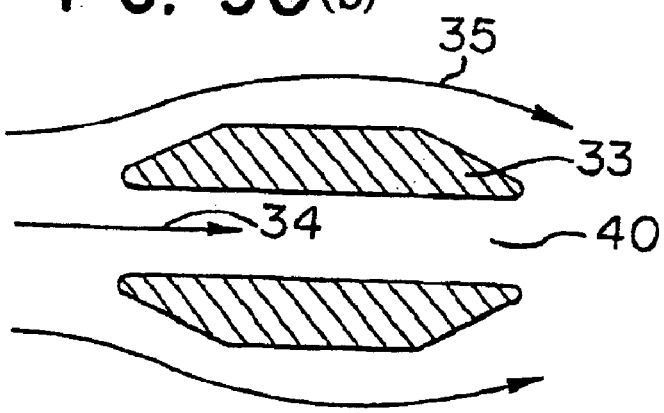

It is sufficient that the post 33 has at least a portion of each of the outer wall surfaces formed in a curved or tapered surface expanded outwardly. Even if each of the side walls is formed in a blade-like shape, such as NACA known as blade standards for American aviation as shown in FIG. 30(a), a shape with a portion of a smooth curved surface like an elliptical surface extracted, or is made tapered as shown in FIG. 30(b), the post can offer a similar effect. A streamlined surface and a tapered surface may be combined. In FIGS. 30(a) and 30(b) are shown cross-sectional views wherein the post is cut in the transverse direction along the flow direction to explain how the streams flow.

Embodiment 6

Figure 31:
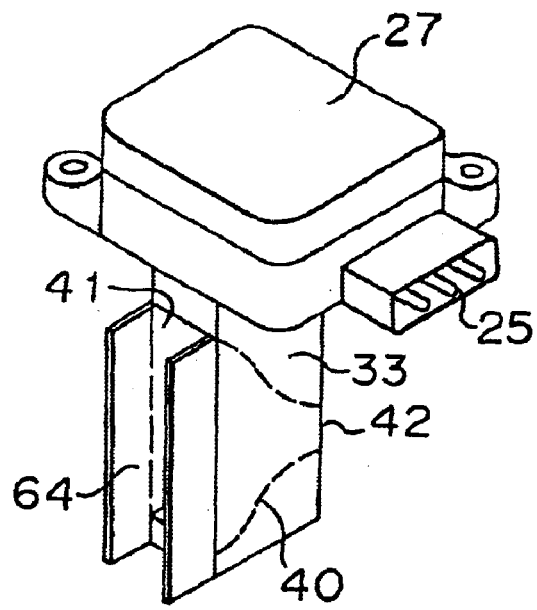
FIG. 31 is a perspective view of the flow rate measuring device according to a sixth embodiment of the present invention.
Figure 32A:
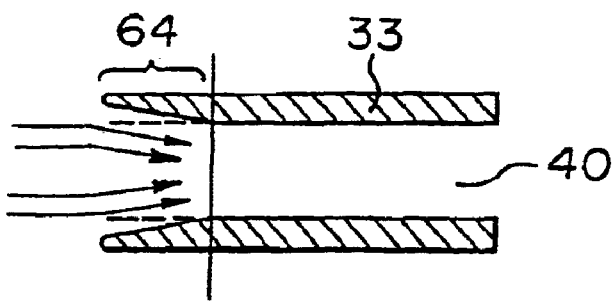
Figure 32B:
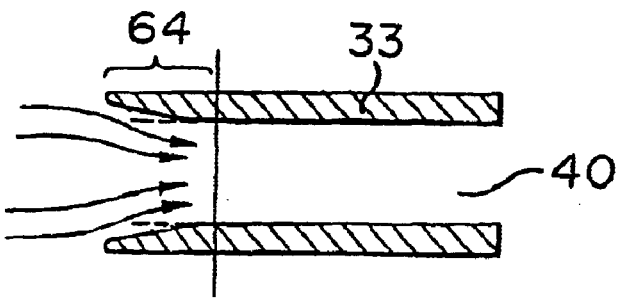

A sixth embodiment provides an arrangement to further reduce a detection error caused by swirling streams. In FIG. 31 is shown a perspective view of the flow rate measuring device according to the sixth embodiment. In this FIG., reference numeral 64 designates one of projections, which are provided in the vicinity of the introduction port 41 of the measuring duct 40 so as to project the upstream side, and which are parallel plates provided at the long sides of the introduction port 41. As shown in FIGS. 32(a) and 32(b), the plate-shaped projections 64 have leading edges formed with a tapered or curved portions so as to decrease the wall thickness toward the leading edges, gradually expanding the distance between the inner surfaces of the plate-shaped projections 64 toward the leading edges. In FIGS. 32(a) and 32(b) are cross-sectional views of the post 33 cut in the transverse direction along the flow direction to explain how the streams flow.

Now, the operation according to this embodiment will be explained. As stated earlier with respect to the first embodiment, the occurrence of a swirling stream produces a detection error in the flow rate measuring device. The flow, which is directed from upstream to the introduction port 41 of the measuring duct 40, is preliminarily divided into a plurality vortexes by the projections 64, and then the vortexes arrive at the introduction port 41 of the measuring duct 40, having the rotation caused by the swirling stream weakened. The explanation of the operation after that will be omitted since it is the same as that referred to the first embodiment.

In the flow rate measuring device thus constructed in accordance with the sixth embodiment, the provision of the projections 64, which project toward the upstream side of the measuring duct 40, can preliminarily carry out division into the plural vortexes and introduce the divided vortexes to the introduction port 41 of the measuring duct 40. This means that the rotation of vortexes has been already weakened to some extent at the introduction port 41 of the measuring duct. In comparison with the arrangement without the projections 64 according to the first embodiment shown in FIG. 1, the arrangement according to this embodiment can introduce the swirling vortexes into the measuring duct 40, further weakening the rotation of the vortexes throughout a portion of the measuring duct between the introduction port 40 and the exit port 42. Thus, the flow rate measuring device can carry out flow rate measurement with much better accuracy.

Since the projections 64 are plate-shaped members provided in parallel on the long sides of the introduction port 41, the vortex caused by a swirling stream can be ensured to be separated.

Since the projections 64 have the tapered or curved portions formed so as to become thinner toward the leading edges, the fluid can be stably introduced in a greater amount.

Figure 33:
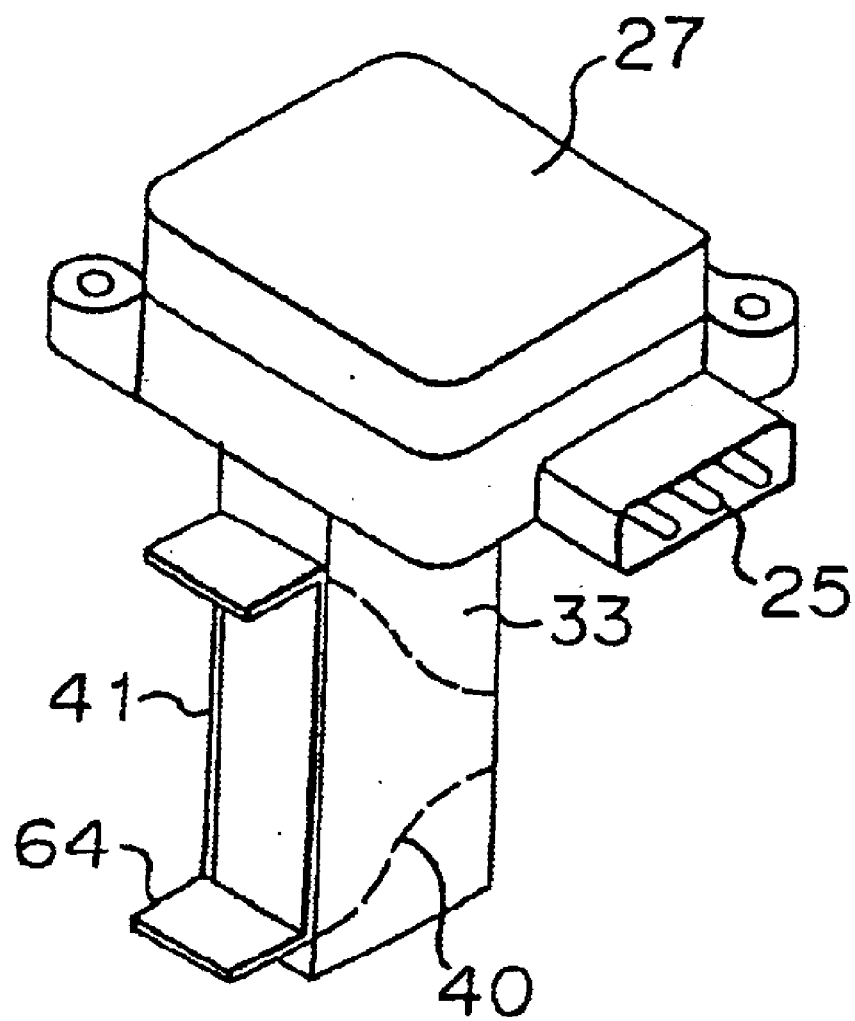
FIG. 33 is a perspective view showing a modified example of the projections according to the sixth embodiment.
Figure 34A:
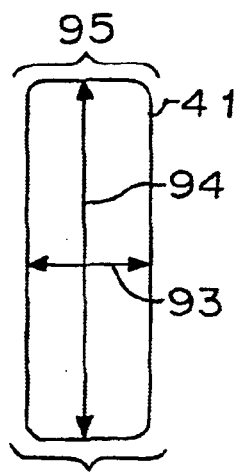
FIGS. 34(a)–34(f) are plan views showing different shapes of the fluid introduction port according to a seventh embodiment of the present invention.
Figure 34B:
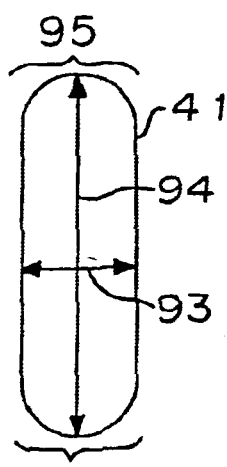
Figure 34C:
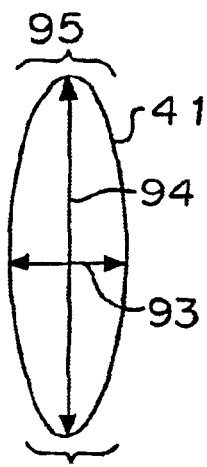
Figure 34D:
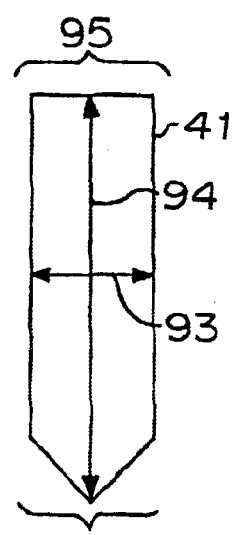
Figure 34E:
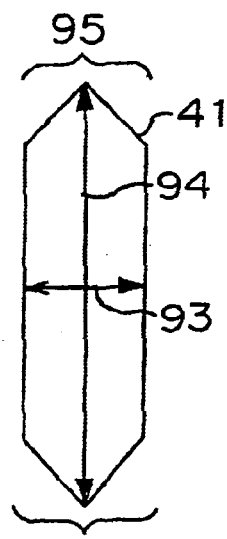
Figure 34F:
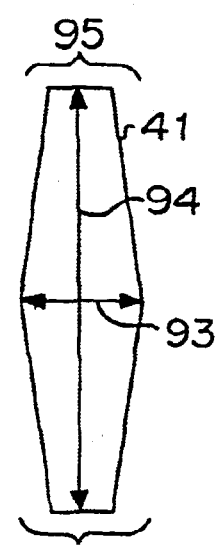
Figure 36:
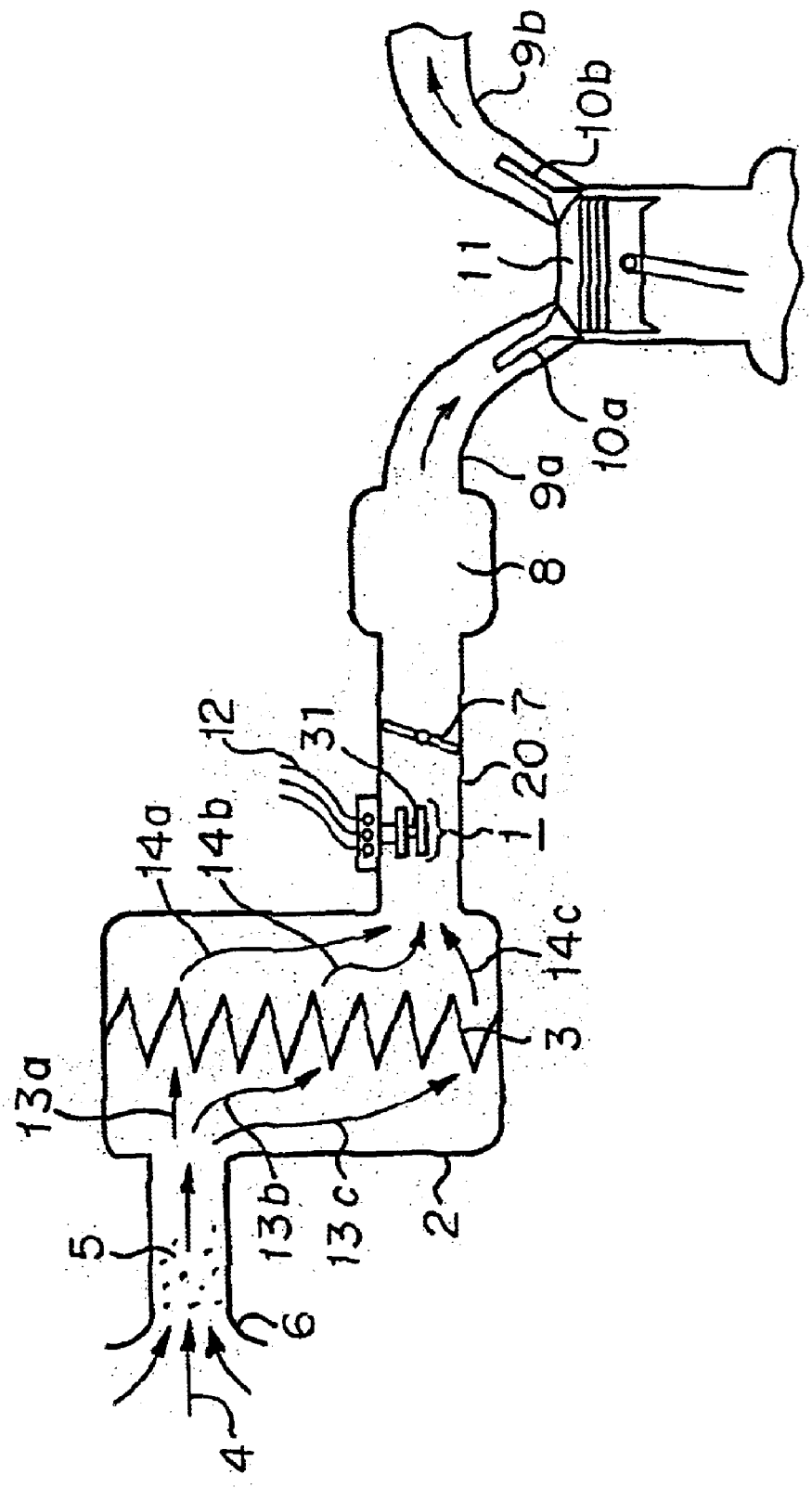
FIG. 36 is a schematic cross-sectional view to show the structure of a typical induction system for automobile engines.
Figure 37:
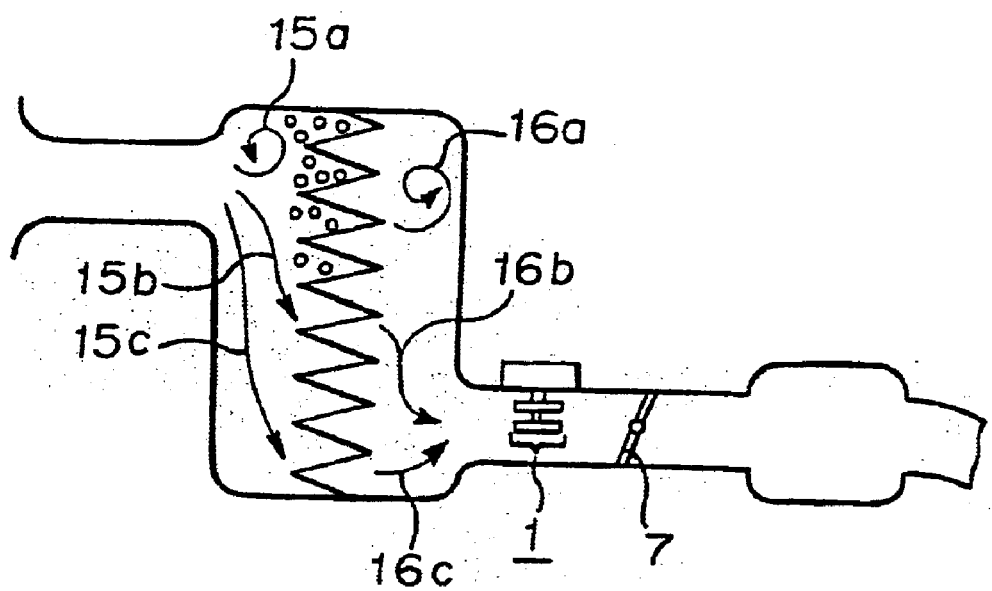
FIG. 37 is a schematic view to show how air flows when dirt and dust has deposited on an air filter.
Figure 38A:
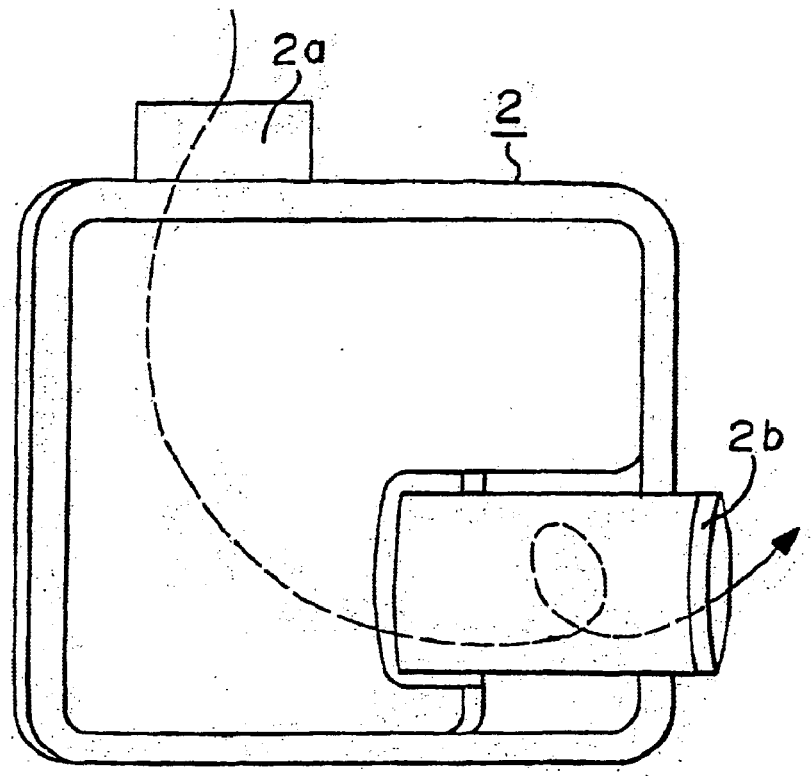
FIGS. 38(a) and 38(b) bare a plan view and a side view to show an example of an air cleaner.
Figure 38B:
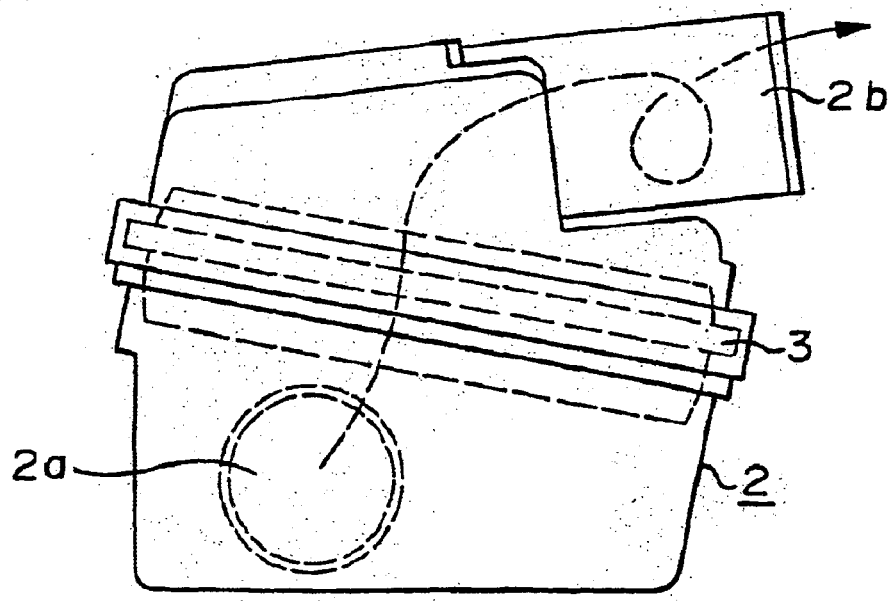

The plate-shaped members 64 may be provided by extending the side walls of the post 33 at the long sides of the introduction port 41 in the upstream direction as shown in this embodiment. Even if the projections are formed by extending the side walls at the short sides as shown in FIG. 33, such an arrangement can offer a similar effect with a possible minimized difference since the extension of the side walls at the short sides is the same as the extension of side walls at the long sides in that the vortex caused by a swirling stream is preliminarily divided into a plural vortexes and then the plural vortexes are introduced to the introduction port of the measuring device 40.

Embodiment 7

Although explanation of the respective embodiments has been made with respect to a case wherein the introduction port 41 is formed in a rectangular shape, the introduction port may be formed in any shapes, such as those shown in FIGS. 34(*a*)–34(*f*) as long as the introduction port is made in an elongated shape. In these FIGS., reference numeral 93 designates the transverse direction of the introduction port, and reference numeral 94 designates the longitudinal direction of the introduction port. When the shapes shown in these Figures are applied to the first embodiment, the measuring duct is contracted so that the length in the longitudinal direction 94 is substantially smoothly narrowered toward the downstream direction at at least a portion of the measuring duct between a portion upstream the flow rate detector (the mounting member 32) and the flow rate detector. When the shapes shown in these Figures are applied to the second embodiment, the length in the transverse direction 93 is also gradually narrowered. In these FIGS., reference numeral 95 designates a region of the restricted portion 45 when the length of the longitudinal direction 94 is contracted. In particular, when the introduction port is formed so as to have corners rounded as shown in FIGS. 34(*a*)–34(*c*) the entire restricted portion may have corners rounded from the introduction port to the downstream side. In this case, the shape of a mold for preparing the flow measuring device from plastic material can be simplified. In addition, separation at the corners hardly occurs, minimizing the occurrence of a detection error.

Embodiment 8

In FIGS. 35(*a*) and 35(*b*) are shown a front view and a vertical cross-sectional view of the flow rate measuring device according to an eighth embodiment of the present invention. In this FIG., reference numeral 88 designates a cylindrical flow rate detecting element. In this embodiment, the cylindrical flow rate detecting element 88 is provided, instead of the flow rate detector according to the first embodiment, which comprises the mounting member 32 and the flow rate detecting element 31. The cylindrical flow rate detecting element 88 may be prepared by winding a platinum wire as a heat-sensitive resistor on a ceramic pipe in coiled fashion, or by depositing a platinum film on a ceramic pipe and subjecting the ceramic pipe to spiral cut. The cylindrical flow rate detecting element 88 is heated to be warmer than the temperature of a fluid by a certain temperature, and the heating current to the cylindrical flow rate detecting element 88 is used as a signal indicative of a flow rate.

This embodiment is different from the first embodiment only in that the flow rate detector comprises the cylindrical flow rate detecting element 88, in place of a combination of the mounting member 32 and the flow rate detecting element 31 according to the first embodiment.

In this embodiment, a swirling vortex is divided into a plurality of vortexes at the elongated introduction port, and the divided vortexes have the rotation strengthened and are contracted during passing through the single measuring duct with neither separating partition nor a similar member provided therein. While being contracted, adjacent vortexes have the rotary energy weakened by friction each other. In addition the scale of the vortexes can be made smaller. Thus, the rotary energy of the swirling vortexes is weakened, and a non-uniform flow distribution is corrected by the contraction to reduce a disturbing degree. Further, the occurrence of separation regions can be reduced between the introduction port 41 and the cylindrical flow rate detecting element 88 to carry out flow rate measurement with good accuracy and minimized noise in the flow rate measuring device.

It is sufficient that the measuring duct 40 is required to form a single hole, that is to say, a space with neither separating partition nor a similar member provided therein at at least a portion thereof between the fluid introduction port and the cylindrical flow rate detecting element 88.

Although explanation of this embodiment has been made with respect to a case the cylindrical flow rate detecting element 88 is a bobbin type sensor, this embodiment is not limited to such a case. A heat-sensitive flow rate sensor can be applied to offer a similar effect as long as it has the same basic principal as a normal hot wire anemometer.

The flow rate measuring device according to any one of the embodiments is not limited to an intake air flow rate measuring device for an internal combustion engine, and the flow rate measuring device can be used as a normal flow meter.

Obviously, numerous modifications and variations of the present invention are possible in light of the above teachings. It is therefore to be understood that within the scope of the appended claims, the invention may be practiced otherwise than as specifically described herein.

What is claimed is:

1. A flow rate measuring device comprising:
a post located in a fluid passage, the fluid passage passing a fluid flow and the post extending across a part of the fluid flow;
a measuring duct in the post, the measuring duct including a fluid introduction port having an elongated shape confronting a flow direction of the fluid flow, the elongated shape having a maximum inside dimension in a longitudinal direction and an inside dimension in a transverse direction, perpendicular to the longitudinal direction and smaller than the maximum inside dimension, the longitudinal and transverse directions being perpendicular to the fluid flow; and
a flow rate detector located in the measuring duct and comprising a substantially plate-shaped mounting member extending along the fluid flow and bridging the measuring duct, substantially parallel to the longitudinal direction of the elongated shape of the fluid introduction port, and a flow rate detection element on a main surface of the mounting member, wherein the measuring duct has a portion extending from the fluid introduction port to the flow rate detector substantially smoothly narrowing along the longitudinal direction of the elongated shape.

2. The device according to claim 1, wherein the measuring duct extends substantially linearly in a direction from an upstream side of the fluid passage toward a downstream side of the fluid passage.

3. The device according to claim 1, wherein the fluid introduction port has a length in the longitudinal direction and a width in a transverse direction, transverse to the longitudinal direction, the longitudinal length being at least twice the width.

4. The device according to claim 1, wherein the measuring duct includes a first pair of generally smooth, converging inner wall surfaces, narrowing toward a downstream direction of the fluid flow, each of the smooth inner wall surfaces having a profile, in a cross-section parallel to the fluid flow direction and to the post, and a second pair of generally smooth converging inner wall surfaces, generally transverse to the first pair of inner wall surfaces, narrowing in the downstream direction, and having a curved profile in a plane perpendicular to the fluid introduction port and parallel to a longitudinal direction of the fluid introduction port.

5. The device according to claim 4, wherein each of the curved profiles include an inflection point.

6. The device according to claim 1, wherein the measuring duct narrows to at least a position where an upstream end of the flow rate detector is located.

7. The device according to claim 1, wherein the measuring duct narrows to at least a position where a flow rate detecting element of the flow rate detector is located.

8. The device according to claim 1, wherein the fluid introduction port has, in a plane perpendicular to the fluid flow, a closed curve shape.

9. The device according to claim 1, wherein the measuring duct has a first pair of generally smooth, converging inner wall surfaces, narrowing toward a downstream direction of the fluid flow, each of the smooth inner wall surfaces having a profile, in a cross-section parallel to the fluid flow direction and to the post, and a second pair of inner wall surfaces, generally transverse to the first pair of inner wall surfaces, and extending from a location upstream of the flow rate detector to the flow rate detector and narrowing toward the downstream direction, in a transverse direction of the fluid introduction port.

10. The device according to claim 1, wherein the measuring duct includes an outer wall surface that, at least in part, extends outwardly.

11. The device according to claim 1, including projections located on the duct near the fluid introduction port and extending in an upstream direction.

12. The device according to claim 11, wherein the fluid introduction port has a substantially rectangular shape in a plane transverse to the fluid flow, and the projections are located at least one pair of long sides and short sides of the fluid introduction port, the projections being parallel plates.

13. The device according to claim 1, wherein the post extends into the fluid passage through an opening in a side wall of the fluid passage.

14. The device according to claim 1, wherein the portion from the fluid introduction port to the flow rate detector comprises a single hole.

15. The device according to claim 14, wherein the measuring duct includes a notch at the single hole.

* * * * *